United States Patent
Ryu et al.

(10) Patent No.: US 11,595,911 B2
(45) Date of Patent: Feb. 28, 2023

(54) METHOD AND APPARATUS FOR CONTROLLING UE TRANSMISSION POWER IN WIRELESS COMMUNICATION SYSTEM

(71) Applicant: Samsung Electronics Co., Ltd., Suwon-si (KR)

(72) Inventors: Hyunseok Ryu, Suwon-si (KR); Jeongho Yeo, Suwon-si (KR); Jinyoung Oh, Suwon-si (KR); Sungjin Park, Suwon-si (KR); Jonghyun Bang, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/366,503

(22) Filed: Jul. 2, 2021

(65) Prior Publication Data
US 2021/0337485 A1 Oct. 28, 2021

Related U.S. Application Data

(63) Continuation of application No. 16/790,157, filed on Feb. 13, 2020, now Pat. No. 11,057,841.

(30) Foreign Application Priority Data

Feb. 13, 2019 (KR) .................... 10-2019-0016921
Mar. 28, 2019 (KR) .................... 10-2019-0035894
Jun. 10, 2019 (KR) .................... 10-2019-0068209

(51) Int. Cl.
*H04W 52/24* (2009.01)
*H04W 72/04* (2009.01)
*H04W 72/20* (2023.01)

(52) U.S. Cl.
CPC ......... *H04W 52/242* (2013.01); *H04W 72/20* (2023.01)

(58) Field of Classification Search
CPC ............. H04W 52/242; H04W 52/245; H04W 52/247; H04W 52/383; H04W 72/0406; H04W 76/14

(Continued)

(56) References Cited

U.S. PATENT DOCUMENTS 11,057,841 B2 * 7/2021 Ryu .................... H04W 52/242
2013/0324182 A1 12/2013 Deng et al.

(Continued)

FOREIGN PATENT DOCUMENTS

EP 3225044 A1 10/2017
WO 2013-181444 A1 12/2015

OTHER PUBLICATIONS

International Search Report dated May 21, 2020, issued in an International Application No. PCT/KR2020/002053.

(Continued)

*Primary Examiner* — Tan H Trinh
(74) *Attorney, Agent, or Firm* — Jefferson IP Law, LLP

(57) ABSTRACT

The disclosure relates to a communication method and a system for converging a 5$^{th}$-Generation (5G) communication system for supporting higher data rates beyond a 4$^{th}$-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services.

20 Claims, 20 Drawing Sheets

(a) In-coverage scenario

(58) Field of Classification Search
USPC .................................................. 455/69, 522
See application file for complete search history.

(56) References Cited

U.S. PATENT DOCUMENTS

| | | | | |
|---|---|---|---|---|
| 2014/0274196 A1* | 9/2014 | Dai | ..................... | H04W 52/242 |
| | | | | 455/522 |
| 2015/0327189 A1 | 11/2015 | Seo et al. | | |
| 2016/0227493 A1 | 8/2016 | Kwak et al. | | |
| 2016/0353450 A1 | 12/2016 | Miao | | |
| 2017/0150490 A1 | 5/2017 | Chen et al. | | |
| 2017/0188316 A1 | 6/2017 | Seo et al. | | |
| 2017/0367056 A1* | 12/2017 | Wei | ..................... | H04W 52/325 |
| 2018/0014262 A1* | 1/2018 | Lee | ..................... | H04W 52/367 |
| 2018/0206176 A1 | 7/2018 | Panteleev et al. | | |
| 2019/0173612 A1* | 6/2019 | Kimura | ................. | H04L 1/1819 |
| 2019/0229964 A1 | 7/2019 | Ouchi et al. | | |
| 2019/0387377 A1 | 12/2019 | Zhang et al. | | |
| 2020/0092692 A1 | 3/2020 | Wang et al. | | |
| 2020/0107236 A1 | 4/2020 | Tseng et al. | | |
| 2020/0120730 A1 | 4/2020 | Ryu et al. | | |
| 2020/0205165 A1 | 6/2020 | Huang et al. | | |
| 2020/0229105 A1 | 7/2020 | Cai et al. | | |
| 2021/0377710 A1* | 12/2021 | Kim | ..................... | H04L 5/10 |
| 2022/0070879 A1* | 3/2022 | Ryu | ..................... | H04W 56/001 |
| 2022/0085951 A1* | 3/2022 | Lee | ..................... | H04L 1/18 |
| 2022/0095278 A1* | 3/2022 | Kim | ..................... | H04L 27/26 |
| 2022/0110067 A1* | 4/2022 | Ryu | ..................... | H04W 24/08 |
| 2022/0116168 A1* | 4/2022 | Lee | ..................... | H04W 92/18 |

OTHER PUBLICATIONS

Extended European Search Report dated Feb. 16, 2022, issued a counterpart European Application No. 20755149.0.
3rd Generation Partnership Project; Technical Specification Group Radio Access Network; Evolved Universal Terrestrial Radio Access (E-UTRA); Physical layer procedures (Release 15), 3GPP Standard; Technical Specification; 3GPP TS 36.213, 3rd Generation Partnership Project (3GPP), vol. RAN WG1, No. XP051591674, V15.4.0, Jan. 11, 2019, pp. 477-533.
European Office Action dated Dec. 14, 2022, issued a counterpart European Application No. 20 755 149.0-1206.

* cited by examiner (a) In-coverage scenario (b) Partial coverage scenario (c) Out-of-coverage scenario (d) Intel-cell V2X Communication scenario (a) Unicast V2X Communication (b) Groupcast V2X Communication (a) Unicast V2X Communication (b) Groupcast V2X Communication

METHOD AND APPARATUS FOR CONTROLLING UE TRANSMISSION POWER IN WIRELESS COMMUNICATION SYSTEM

CROSS-REFERENCE TO RELATED APPLICATION(S)

This application is a continuation application of prior application Ser. No. 16/790,157, filed on Feb. 13, 2020, which will be issued as U.S. Pat. No. 11,057,841 on Jul. 6, 2021, which is based on and claimed priority under 35 U.S.C. § 119(a) of a Korean patent application number 10-2019-0016921, filed on Feb. 13, 2019, in the Korean Intellectual Property Office, of a Korean patent application number 10-2019-0035894, filed on Mar. 28, 2019, in the Korean Intellectual Property Office, and of a Korean patent application number 10-2019-0068209, filed on Jun. 10, 2019, in the Korean Intellectual Property Office, the disclosure of each of which is incorporated by reference herein in its entirety.

BACKGROUND

1. Field

The disclosure relates to a method for controlling user equipment (UE) transmission power in a wireless communication system. More particularly, the disclosure relates to a method and an apparatus for setting transmission power when a UE (terminal) transmits a sidelink control channel and a sidelink data channel.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (millimeter (mm)Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency-shift keying (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In accordance with what described above and the development of a mobile communication system, various services can be provided, and a plan to effectively provide these services is thus required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for controlling transmission powers of a sidelink control channel and a sidelink data channel.

In an aspect of the disclosure, a method performed by a first user equipment (UE) in a wireless communication system is provided. The method includes receiving, from a base station, a radio resource control (RRC) message including information related to sidelink transmission power, determining sidelink transmission power, based on the information, and transmitting a sidelink control channel and a sidelink data channel, based on the determined sidelink transmission power, wherein the information includes at least one of downlink path loss-related information or sidelink path loss-related information.

In another aspect of the disclosure, a method performed by a base station in a wireless communication system is provided. The method includes transmitting, to a first UE, an RRC message including information related to sidelink transmission power, and receiving, from the first UE, a sidelink control channel and a sidelink data channel, based on sidelink transmission power, wherein the sidelink transmission power is determined based on the information, and wherein the information includes at least one of downlink path loss-related information or sidelink path loss-related information.

In another aspect of the disclosure, a first UE is provided. The first UE includes a transceiver configured to transmit or receive at least one signal, and at least one processor coupled to the transceiver. The at least one processor is configured to receive, from a base station, an RRC message including information related to sidelink transmission power, determine sidelink transmission power, based on the information, and transmit a sidelink control channel and a sidelink data channel, based on the determined sidelink transmission power, and wherein the information includes at least one of downlink path loss-related information or sidelink path loss-related information.

In another aspect of the disclosure, a base station is provided. The base station includes a transceiver configured to transmit or receive at least one signal, and at least one processor coupled to the transceiver. The at least one processor is configured to transmit, to a first UE, an RRC message including information related to sidelink transmission power, and receive, from the first UE, a sidelink control channel and a sidelink data channel, based on sidelink transmission power, wherein the sidelink transmission power is determined based on the information, and wherein the information includes at least one of downlink path loss-related information or sidelink path loss-related information.

Additional aspects will be set forth in part in the description which follows and, in part, will be apparent from the description, or may be learned by practice of the presented embodiments.

According to the technology, transmission powers of a sidelink control channel and a sidelink data channel can be effectively controlled.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
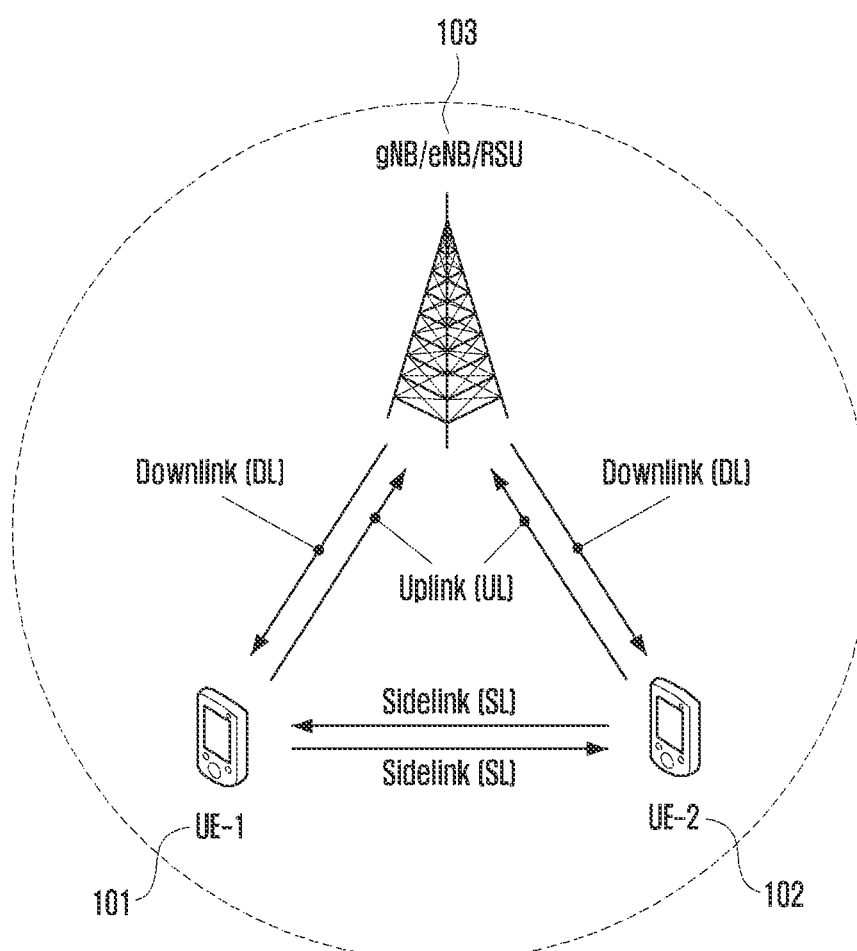
FIG. 1A illustrates a system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments, descriptions of technologies which are already known in the technical field to which the disclosure belongs and are not directly related to the disclosure are omitted. Such an omission of unnecessary descriptions is intended to prevent obscuring of the main idea of the disclosure and more clearly transfer the main idea.

For the same reason, in the accompanying drawings, some elements are exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the following embodiments and may be implemented in various different forms, and the embodiments of the disclosure are provided to make the disclosure perfect and completely inform those skilled in the art of the scope of the disclosure and the disclosure is only defined by the scope of the claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable data processing apparatus to produce a computer implemented process such that the instructions that execute on the computer or other programmable data processing apparatus provide operations for implementing the functions specified in the flowchart block or blocks.

In addition, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more central processing units (CPUs) within a device or a security multimedia card. Also, in an embodiment, the "~unit" may include one or more processors.

In the embodiments described in detail, main objects are a radio access network (new RAN, NR) and a core network, namely packet core (5G system, 5G core network, or next generation core (NG Core)) in the 5G mobile communication standard specified by a mobile communication standard standardization organization (3GPP). However, the main idea of the disclosure is that the disclosure can be applied to other communication systems having a similar technical background, through a minor modification without deviating far from the range of the disclosure and the application can be conducted by the determination of a person having technical knowledge and skilled in the technical field to which the disclosure belongs.

In a 5G system, in order to support the network automation, a network data collection and analysis function (NWDAF), which is a network function of analyzing data collected in a 5G network and providing the analyzed data, can be defined. The NWDAF can collect/store/analyze information from/in/of the 5G network and provide a result for an unspecified network function (NF), and the analysis result can be independently used in each NF.

Hereinafter, for convenience of description, a part of terms and names, which are defined in the 3rd generation partnership project long term evolution (3GPP LTE) standard such as a standard of 5G, NR, LTE, or a system similar to these systems, can be used. However, the disclosure is not limited by the terms and names, and may be equally applied to a system that is based on another standard.

In addition, terms used below are illustrated for convenience of description, for example, a term used to identify an access node, a term indicating network entities, a term indicating messages, a term indicating an interface between the network entities, a term indicating various pieces of identification information, and the like. Accordingly, the disclosure is not limited to the following terms and other terms having the same technical meaning can be used.

In order to meet wireless data traffic demands that have increased after 4G communication system commercialization, efforts to develop an improved 5G communication system (new radio, NR) have been made. In order to achieve a high data transmission rate, the 5G communication system is designed to support in a mmWave band (for example, 28 GHz frequency band). In the 5G communication system, technologies such as beamforming, massive MIMO, full dimensional MIMO (FD-MIMO), array antenna, analog beam-forming, and large scale antenna are being discussed as a means to mitigate a propagation path loss in the mmWave band and increase a propagation transmission distance. Unlike LTE, the 5G communication system includes 15 kHz to support various subcarrier spacings such as 30 kHz, 60 kHz, and 120 kHz, and a physical control channel uses polar coding and a physical data channel uses low density parity check (LDPC). As well as discrete fourier transform spread orthogonal frequency-division multiplexing (DFT-S-OFDM), cyclic prefix (CP)-OFDM is used as a waveform for uplink transmission. LTE supports hybrid automatic repeat request (ARQ) (HARQ) retransmission based on a transport block (TB), whereas 5G can additionally support HARQ retransmission based on a code block group (CBG) consisting of code blocks (CB).

Further, the 5G communication system has developed technologies such as an evolved small cell, an advanced small cell, a cloud radio access network (cloud RAN), an ultra-dense network, device-to-device (D2D) communication, a wireless backhaul, a vehicle to everything (V2X) network, cooperative communication, coordinated multi-points (CoMP), and received interference cancellation so as to improve the system network.

Meanwhile, the Internet has evolved from a human-oriented connection network in which humans generate and consume information to an internet of things (IoT) network in which distributed elements such as objects exchange and process information. An internet of everything (IoE) technology in which a big data processing technology through a connection with a cloud server or the like is combined with the IoT technology has emerged. In order to implement IoT, technical factors such as sensing technology, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent internet technology (IT) service to create a new value for peoples' lives can be provided. The IoT can be applied to fields such as those of a smart home, a smart building, a smart city, a smart car, a connected car, a smart grid, health care, a smart home appliance, and high-tech medical services through the convergence of the information technology (IT) of the related art and various industries.

Accordingly, various attempts to apply the 5G communication system to the IoT network have been made. For example, a technology such as a sensor network, machine-to-machine (M2M) communication, and machine-type communication (MTC), has been implemented by the 5G communication technology such as beamforming, MIMO, and array antennas. The application of a cloud RAN as the big data processing technology described above may be an example of convergence of a 3eG technology and the IoT technology. Therefore, a plurality of services can be provided for a user in a communication system, and in order to provide the plurality of services for the user, a method for providing each service according to characteristics within the same time section and an apparatus using this method are required. Research on various services, which are provided in the 5G communication system, has been conducted, and one of the services is a service satisfying requirements such as low latency and high reliability.

In a case of vehicle communication, a standardization operation of LTE-based V2X has been completed at 3GPP Rel-14 and Rel-15, based on a device-to-device (D2D) communication structure, and efforts to develop V2X, based on 5G NR, have been currently made. NR V2X will support unicast communication, groupcast (or multicast) communication, and broadcast communication between UEs. In addition, unlike LTE V2X whose purpose is to transmit or receive basic safety information required for vehicle road driving, NR V2X has a purpose of providing further advanced services such as platooning, advanced driving, extended sensor, and remote driving.

When an NR V2X UE exists within the coverage of a base station, the NR V2X UE may receive, from the base station, parameter values for controlling sidelink transmission power, and control sidelink transmission power, based on the parameter values. In addition, when the NR V2X UE exists out of the coverage of the base station, the NR V2X UE may use preset sidelink transmission power control parameter values to control sidelink transmission power. The sidelink transmission power control parameters may include $P_0$ and $\alpha$. In addition, the NR V2X UE may set a transmission power value according to frequency block size of a sidelink control channel and a data channel to be transmitted thereby, as well as the values of $P_0$ and $\alpha$ mentioned above. That is, when the frequency block size of a sidelink control channel and a data channel to be transmitted increases, the transmission power value may increase, and when the frequency block size decreases, the transmission power value may decrease. A sidelink control channel and a data channel may be time-division-multiplexed (TDMed) on the time axis or frequency-division-multiplexed (FDMed) on the frequency axis, before being transmitted. Therefore, a method and an apparatus for controlling UE transmission power to support sidelink transmission power in these various multiplexing methods are required.

An embodiment of the specification is proposed to support the various multiplexing methods described above, and a purpose is to provide a method and an apparatus for controlling transmission powers of a sidelink control channel and a data channel.

A V2X UE mentioned in the disclosure may indicate an NR V2X UE or an LTE V2X UE. In addition, the V2X UE of the disclosure may indicate a vehicle supporting vehicle-to-vehicle (V2V) communication, a vehicle or a pedestrian's handset (that is, smartphone) supporting vehicle-to-pedestrian (V2P) communication, a vehicle supporting vehicle-to-network (V2N) communication, or a vehicle supporting vehicle-to-infrastructure (V2I) communication. In addition, a UE of the disclosure may indicate a road side unit (RSU) having a UE function, an RSU having a base station function, or an RSU having a part of a base station function and a part of a UE function.

Figure 1B:
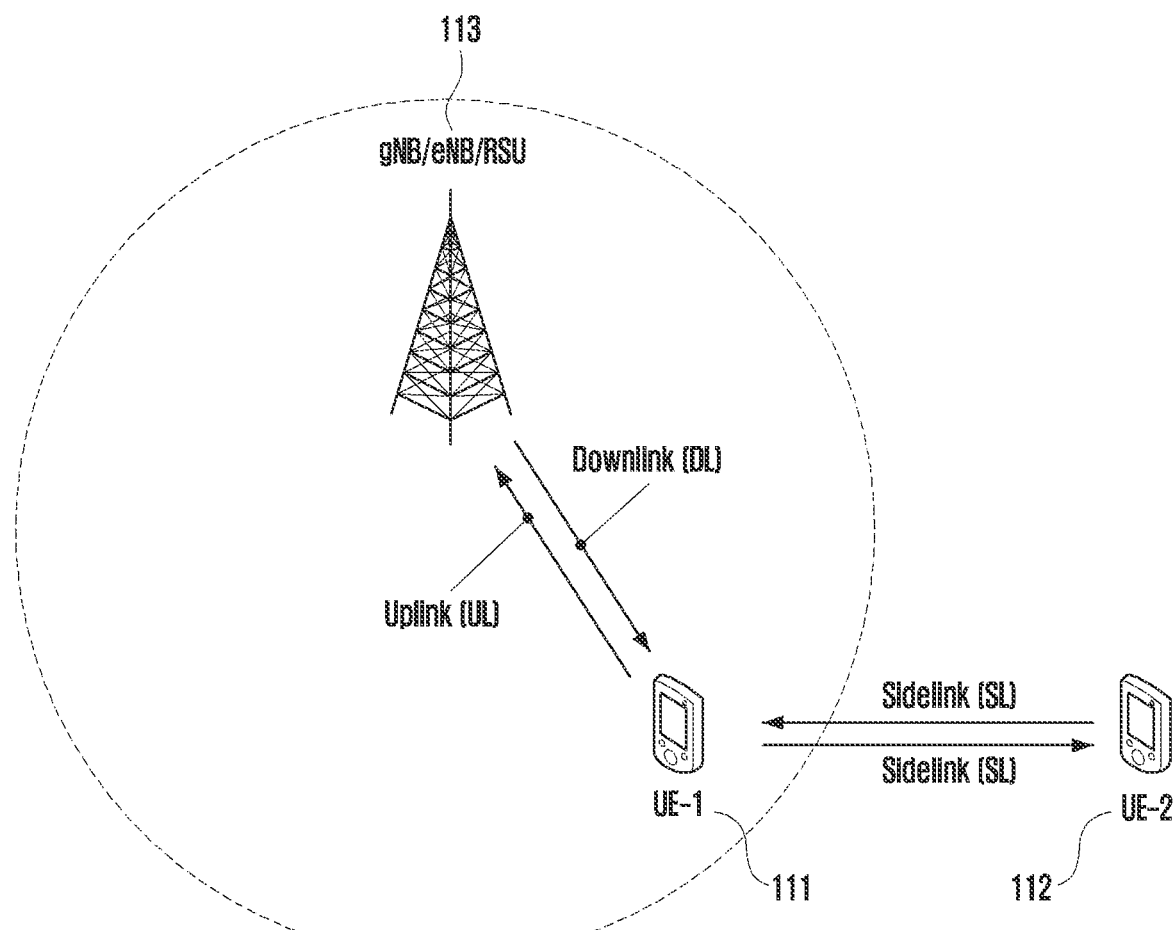
FIG. 1B illustrates a system according to an embodiment of the disclosure.
Figure 1C:
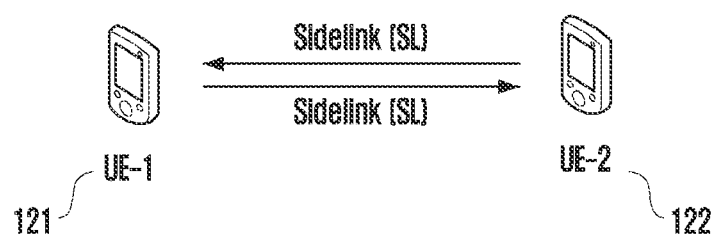
FIG. 1C illustrates a system according to an embodiment of the disclosure.
Figure 1D:
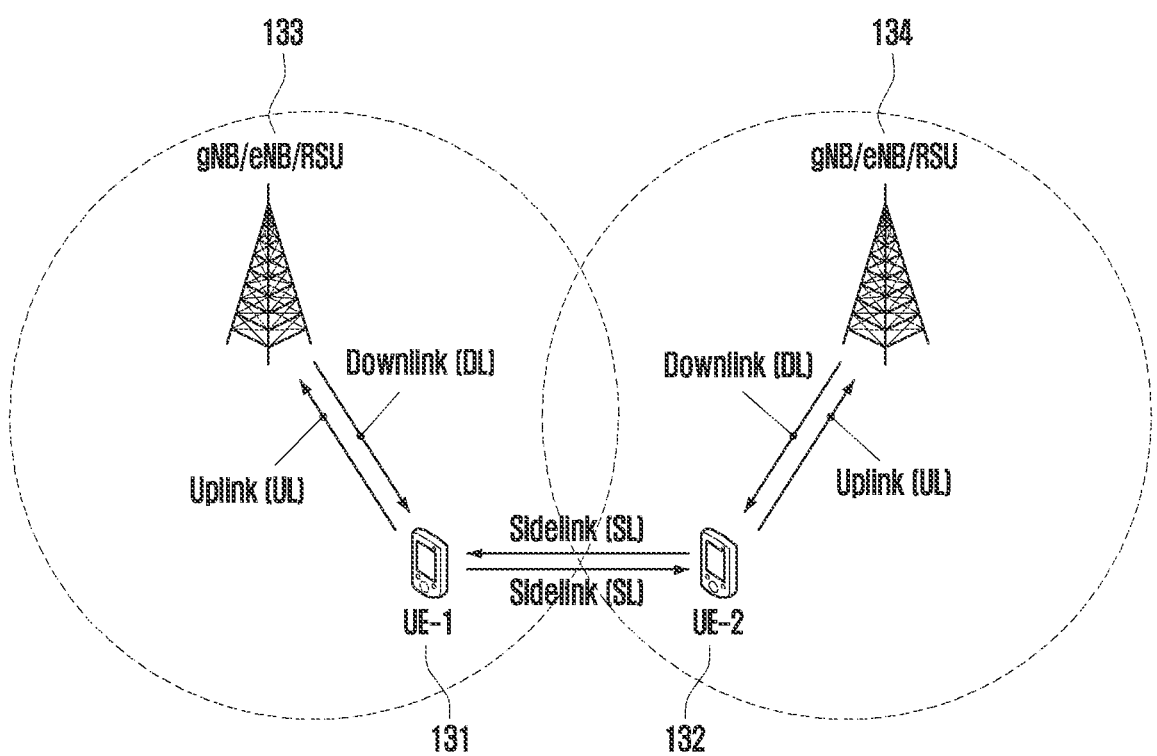
FIG. 1D illustrates a system according to an embodiment of the disclosure.

FIG. 1A illustrates a system according to an embodiment of the disclosure, FIG. 1B illustrates a system according to an embodiment of the disclosure, FIG. 1C illustrates a system according to an embodiment of the disclosure, and FIG. 1D illustrates a system according to an embodiment of the disclosure.

FIG. 1A illustrates a case in which all V2X UEs (UE-1 101 and UE-2 102) are positioned within the coverage of a base station 103.

Referring to FIG. 1A, all the V2X UEs 101 and 102 may receive, from the base station 103, data and control information via downlink (DL), or transmit, to the base station 103, data and control information via uplink (UL). The data and control information may be data and control information for V2X communication, or the data and control information may be data and control information for general cellular communication. In addition, the V2X UEs 101 and 102 may transmit or receive data and control information for V2X communication via sidelink (SL).

FIG. 1B illustrates a case in which among V2X UEs, a UE-1 111 is positioned within the coverage of a base station 113 and a UE-2 112 is positioned out of the coverage of the base station 113. FIG. 1B may illustrate partial coverage. The UE-1 111 positioned within the coverage of the base station 113 may receive, from the base station 113, data and control information via downlink, or transmit, to the base station, data and control information via uplink.

Referring to FIG. 1B, the UE-2 112 positioned out of the coverage of the base station may not receive, from the base station, data and control information via downlink, and may not transmit, to the base station, data and control information via uplink.

The UE-2 112 may transmit/receive data and control information for V2X communication to/from the UE-1 111 via sidelink.

FIG. 1C illustrates a case in which all V2X UEs are positioned out of the coverage of a base station.

Therefore, referring to FIG. 1C, a UE-1 121 and a UE-2 122 may not receive, from a base station, data and control information via downlink, and may not transmit, to the base station, data and control information via uplink.

The UE-1 121 and the UE-2 122 may transmit or receive data and control information for V2X communication via sidelink.

FIG. 1D illustrates a scenario of performing V2X communication between UEs positioned in different cells. Specifically, FIG. 1D illustrates a case in which a V2X transmission UE and a V2X reception UE access different base stations (radio resource control (RRC) connection state) or camp on different base stations (RRC disconnection state, that is, RRC idle state). A UE-1 131 may be a V2X transmission UE and a UE-2 132 may be a V2X reception UE, or the UE-1 131 may be a V2X reception UE and the UE-2 132 may be a V2X transmission UE. The UE-1 131 may receive, from a base station 133 which the UE-1 accesses (or on which the UE-1 camps), a V2X exclusive system information block (SIB), and the UE-2 132 may receive, from another base station 134 which the UE-2 accesses (or on which the UE-2 camps), a V2X exclusive SIB. Information of the V2X exclusive SIB which the UE-1 131 receives and information of the V2X exclusive SIB which the UE-2 132 receives may differ from each other. Therefore, in order to perform V2X communication between UEs positioned in different cells, pieces of information are required to be unified.

FIGS. 1A to 1D illustrate a V2X system constituted by two UEs (UE-1 and UE-2) for convenience of description, but the disclosure is not limited thereto. In addition, uplink and downlink between a base station and V2X UEs may be called an Uu interface, and sidelink between V2X UEs may be called a PC5 interface. Therefore, they can be mixedly used in the disclosure.

Meanwhile, the UE of the disclosure may indicate a vehicle supporting vehicle-to-vehicle (V2V) communication, a vehicle or a pedestrian's handset (that is, smartphone) supporting vehicle-to-pedestrian (V2P) communication, a vehicle supporting vehicle-to-network (V2N) communication, or a vehicle supporting vehicle-to-infrastructure (V2I) communication. In addition, the UE of the disclosure may indicate a road side unit (RSU) having a UE function, an RSU having a base station function, or an RSU having a part of a base station function and a part of a UE function.

In addition, the base station of the disclosure may be previously defined as a base station supporting both V2X communication and general cellular communication or a base station supporting only V2X communication. The base station may indicate a 5G base station (gNB), a 4G base station (eNB), or a road site unit (RSU). Therefore, unless otherwise specified in the disclosure, a base station and an RSU can be mixedly used as the same concept.

Figure 2A:
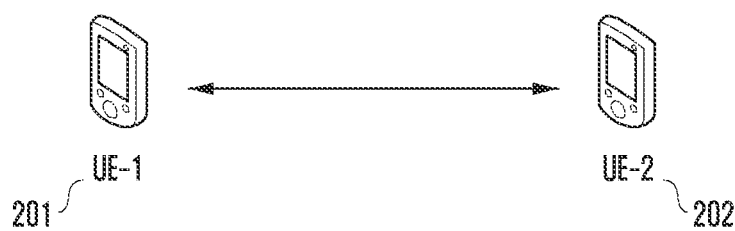
FIG. 2A illustrates a vehicle to everything (V2X) communication method performed via sidelink according to an embodiment of the disclosure.
Figure 2A:
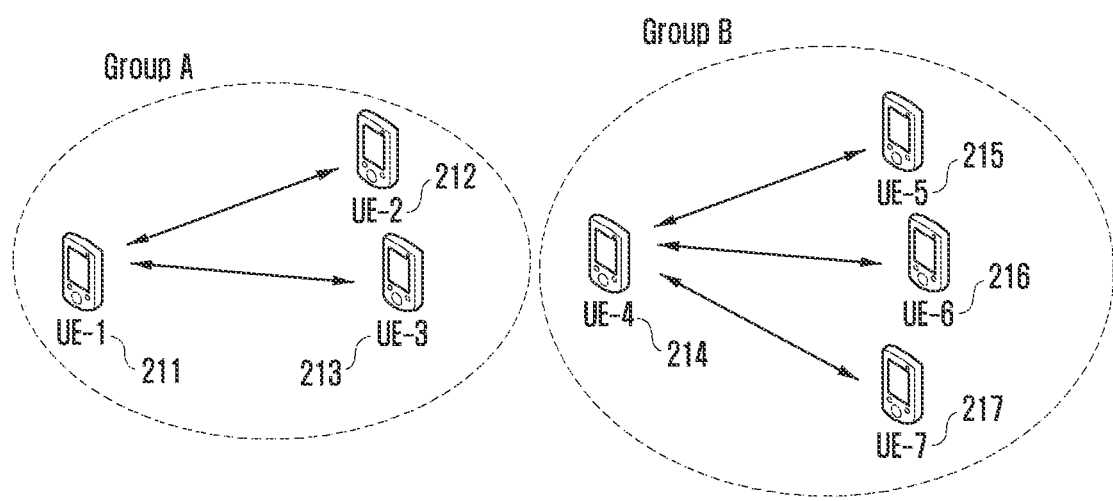
Figure 2B:
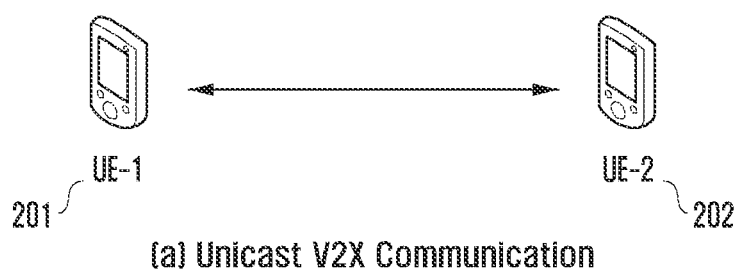
FIG. 2B illustrates a V2X communication method performed via sidelink according to an embodiment of the disclosure.
Figure 2B:
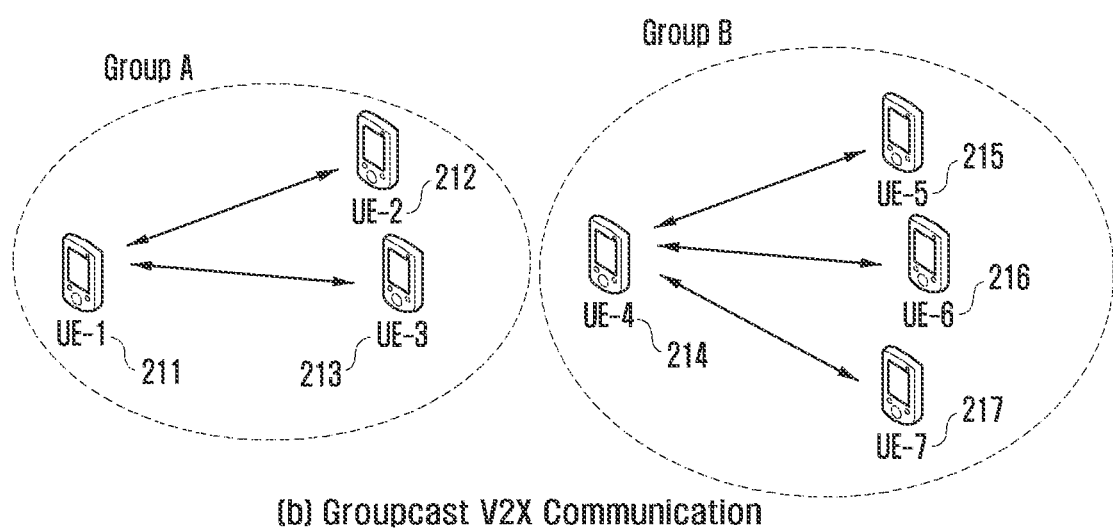

FIG. 2A illustrates a V2X communication method performed via sidelink according to an embodiment of the disclosure, and FIG. 2B illustrates a V2X communication method performed via sidelink according to an embodiment of the disclosure.

Referring to FIG. 2A, a TX UE (a UE-1 201) and an RX UE (a UE-2 202) may perform one-to-one communication, and this communication may be called unicast communication.

Referring to FIG. 2B, a TX UE and an RX UE may perform one-to-many communication, and this communication may be called groupcast or multicast communication.

FIG. 2B is a diagram illustrating that a UE-1 211, a UE-2 212, and a UE-3 213 form group A to perform groupcast communication, and a UE-4 214, a UE-5 215, a UE-6 216, and a UE-7 217 form group B to perform groupcast communication. Each of the UEs performs groupcast communication within a group to which each of the UEs belongs, and communication between different groups is not performed. FIG. 2B illustrates that two groups are formed, but the disclosure is not limited thereto.

Although not shown in FIGS. 2A and 2B, V2X UEs may perform broadcast communication. The broadcast communication indicates a case in which all V2X UEs receive data and control information that a V2X transmission UE transmits via sidelink. For example, assuming that in FIG. 2B, the UE-1 is a transmission UE for broadcast communication, all the UEs (UE-2 212, UE-3 213, UE-4 214, UE-5 215, UE-6 216, and UE-7 217) may receive data and control information that the UE-1 211 transmits.

Figure 3:
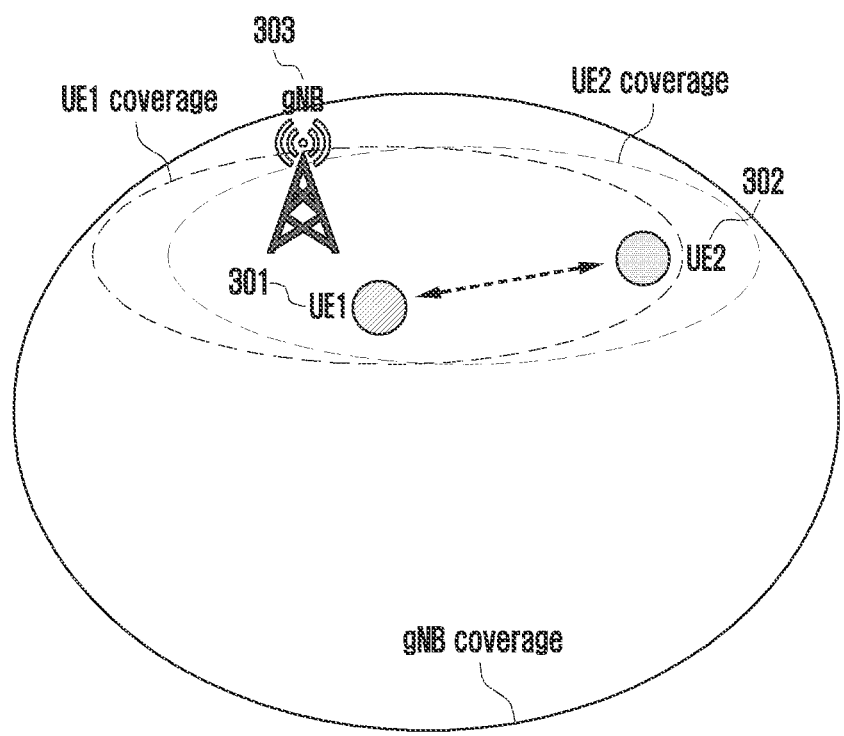
FIG. 3 illustrates V2X transmission power control according to an embodiment of the disclosure.

FIG. 3 illustrates V2X transmission power control according to an embodiment of the disclosure.

Referring to FIG. 3, it is assumed that a UE1 301 is positioned close to a base station (gNB) 303, and a UE2 302 is positioned far from the gNB 303 (that is, the UE 1 is positioned at the cell center and the UE2 is positioned at the cell edge). When the UE1 301 and the UE2 302 perform V2X communication therebetween, it is assumed that the UE1 301 is a V2X transmission UE and the UE2 302 is a V2X reception UE. The UE1 301 may perform sidelink transmission power control for V2X transmission. Parameters for sidelink transmission power of the UE1 301 may include at least $P_0$, $\alpha$, an estimated path loss value, and the size of an allocated frequency block, and may be equal to what shown in Equation 1.

$$\text{Sidelink transmission power} = \min\{Pc\ max, P_0 + \alpha PL + 10\log 10(\text{Number of RBs}*2^\mu) + \Delta\}[\text{dBm}] \quad \text{Equation 1}$$

In Equation 1, each parameter may indicate the following.

Pcmax: Pcmax is a P-max value (when there is no base station, a preset value) indicating the maximum UE transmission output and set by a base station through system information or RRC, and may be determined by a UE by means of UE power class included in the UE.

$P_0$: $P_0$ may indicate a value (when there is no base station, a preset value) set by a base station through system information or RRC in order to guarantee link quality of a reception UE.

$\alpha$: $\alpha$ is a parameter for compensating a path loss value and has a value between 0 and 1, and may indicate a value (when there is no base station, a preset value) set by a base station through system information or RRC. For example, when $\alpha=1$, 100% of path loss may be compensated, and when $\alpha=0.8$, only 80% of path loss may be compensated.

Number of resource blocks (RBs): Number of RBs may indicate size of a frequency block allocated for sidelink transmission. $2^\mu$ may be a parameter for compensating a power spectral density (PSD) which varies depending on a subcarrier spacing. For example, a case of using a subcarrier spacing of 15 kHz may indicate that μ=0. Even if the same number of frequency blocks are used, when the subcarrier spacing is doubled to 30 kHz, the PSD may be reduced by half compared with the case of using the subcarrier spacing of 15 kHz. Therefore, in order to compensate the PSD, power is required to be doubled. More specifically, for example, when two frequency blocks are used, 10 log 10($2 \times 2^0$)=3 dB is required for the subcarrier spacing of 15 kHz, whereas, in order to maintain the same PSD as that for the subcarrier spacing of 15 kHz, transmission power is required to be increased to 10 log 10($2 \times 2^1$)=6 dB for the subcarrier spacing of 30 kHz.

PL: PL may indicate an estimated path loss value. The path loss value may be estimated by Equation 2.

The transmission power of a signal used for path loss estimation−The measured reference signal received power (RSRP) value of a signal used for path loss estimation    Equation 2

Equation 2 may be differently applied depending on a scenario as follows.

When a signal used for path loss estimation is a sidelink signal: the UE1 301, which is a V2X transmission UE, may transmit a sidelink synchronization signal or a sidelink reference signal to the UE2 302 which is a V2X reception UE. The UE2 302 may receive the sidelink synchronization signal or the sidelink reference signal to measure an RSRP value and report the measured RSRP value to the UE1 301. The RSRP value may be transmitted through a physical sidelink feedback channel (PSFCH) or a physical sidelink shared channel (PSSCH). In addition, when the RSRP value is transmitted through the PSSCH, a media access control (MAC) control element (CE) may be used. The UE1 301 may estimate a sidelink path loss value by using Equation 2 through the transmission power of a reference signal that the UE1 transmits to the UE2 302 and the RSRP value reported from the UE2 302. In another example, the UE1 301 may transmit, to the UE2 302, information on the transmission power of the reference signal that the UE1 transmits. Upon receiving the information, the UE2 302 may measure the RSRP value by using the reference signal that the UE1 transmits, and estimate a path loss value through Equation 2. The UE2 302 may transmit an estimated sidelink path loss value to the UE1 301 through the PSFCH or the PSSCH. When the estimated sidelink path loss value is transmitted through the PSSCH, the MAC CE may be used. However, as illustrated in FIG. 3, when a distance between the UE1 301 and the UE2 302 is farther than a distance between the UE1 301 and the gNB 303, a sidelink signal that the UE1 301 transmits may cause interference to a gNB reception signal.

Figure 4:
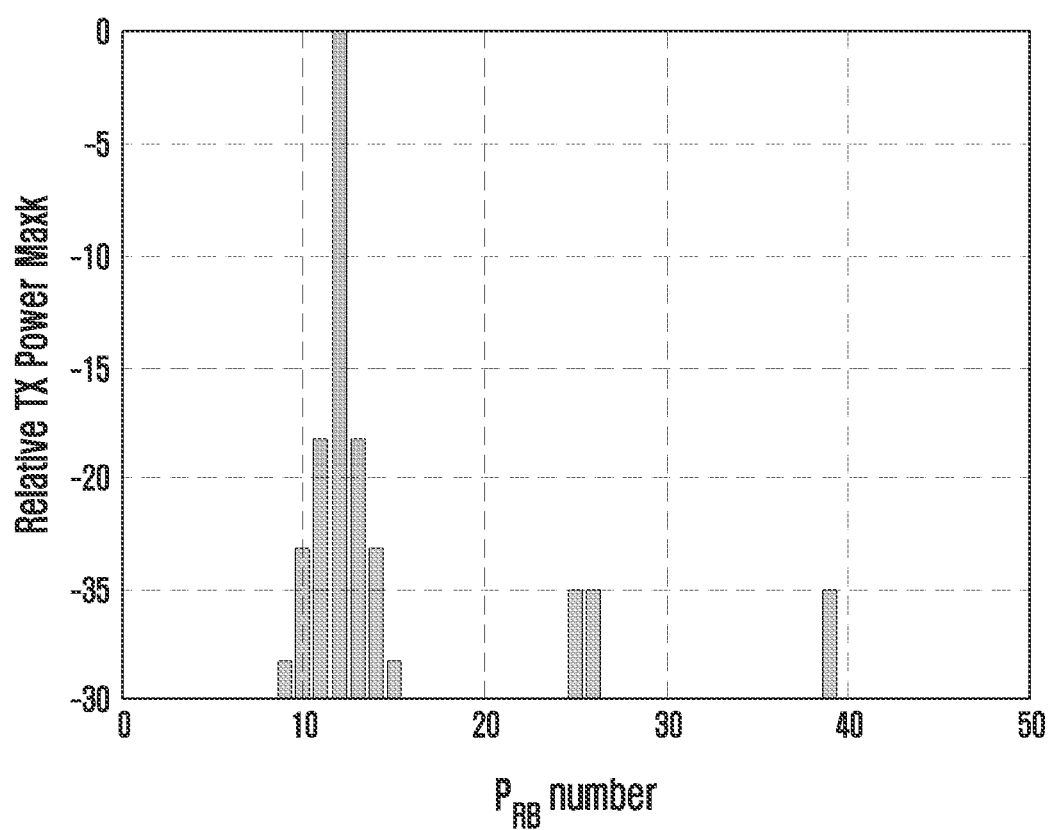
FIG. 4 illustrates interference caused by a frequency block transmitted by a V2X UE in an adjacent frequency block according to an embodiment of the disclosure.

FIG. 4 illustrates interference caused by a frequency block transmitted by a V2X UE in an adjacent frequency block according to an embodiment of the disclosure.

Figure 5:
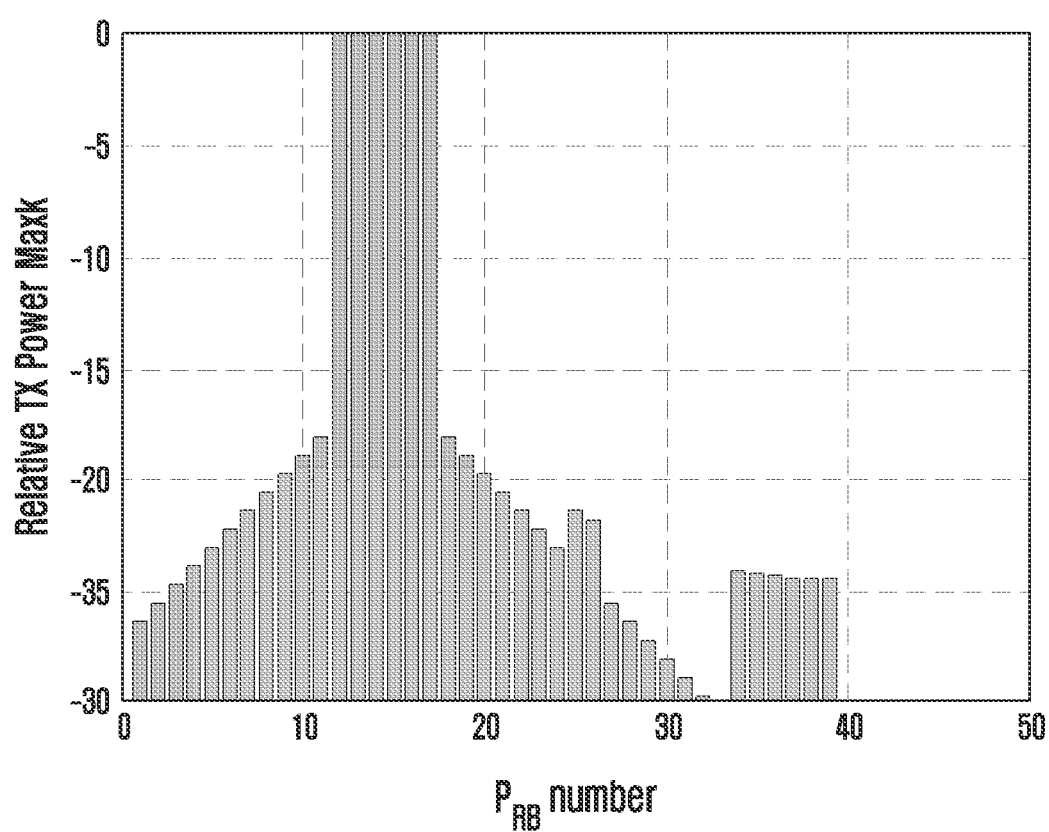
FIG. 5 illustrates interference caused by a frequency block transmitted by a V2X UE in an adjacent frequency block according to an embodiment of the disclosure.

FIG. 5 illustrates interference caused by a frequency block transmitted by a V2X UE in an adjacent frequency block according to an embodiment of the disclosure.

FIGS. 4 and 5 illustrate a degree of interference caused by a sidelink signal in a gNB reception signal. Referring to FIG. 4, it is assumed that sidelink control information or data information is transmitted in resource block index 12 (one resource block is used), and referring to FIG. 5, it is assumed that sidelink control information or data information is transmitted by using five resource blocks from resource block index 12 to 17. Referring to FIG. 4, since sidelink transmission is performed only in resource block index 12, transmission power should be generated only in the corresponding resource index, but it is found that due to interference (in-band emission), transmission power is generated even in neighboring resource indices (for example, index 9, 10, 11, 13, 14, and 15). It is found that as illustrated in FIG. 5, such interference volume becomes bigger as the number of resource blocks allocated for sidelink transmission increases. Therefore, a V2X UE positioned close to the gNB is required to use low transmission power not to cause interference to a reception signal of the gNB.

When a signal used for path loss estimation is a downlink signal of the gNB: in order to reduce the interference caused to the reception signal of the gNB, the UE1, which is a V2X transmission UE, may apply a downlink path loss value of the gNB to Equation 1. More specifically, a downlink path loss value may be estimated by the UE 1 through a channel state information (CSI)-reference signal (RS) that the gNB transmits. In another example, the UE1 may use a secondary synchronization signal (SSS) that the gNB transmits, or both the SSS and a demodulation reference signal (DMRS) transmitted through a physical broadcast channel (PBCH) to estimate a downlink path loss value. More specifically, the gNB may transmit, to the UE1, information on transmission power of a reference signal through system information or RRC configuration, and the UE1 may measure an RSRP value by using the reference signal transmitted by the gNB. The UE1 may estimate a downlink path loss value by using Equation 2 through a transmission power value of the reference signal transmitted from the base station and the RSRP value measured thereby. As the downlink path loss value is used, as illustrated in FIGS. 4 and 5, the interference problem, which is caused to the reception signal of the gNB, can be solved.

Figure 6:
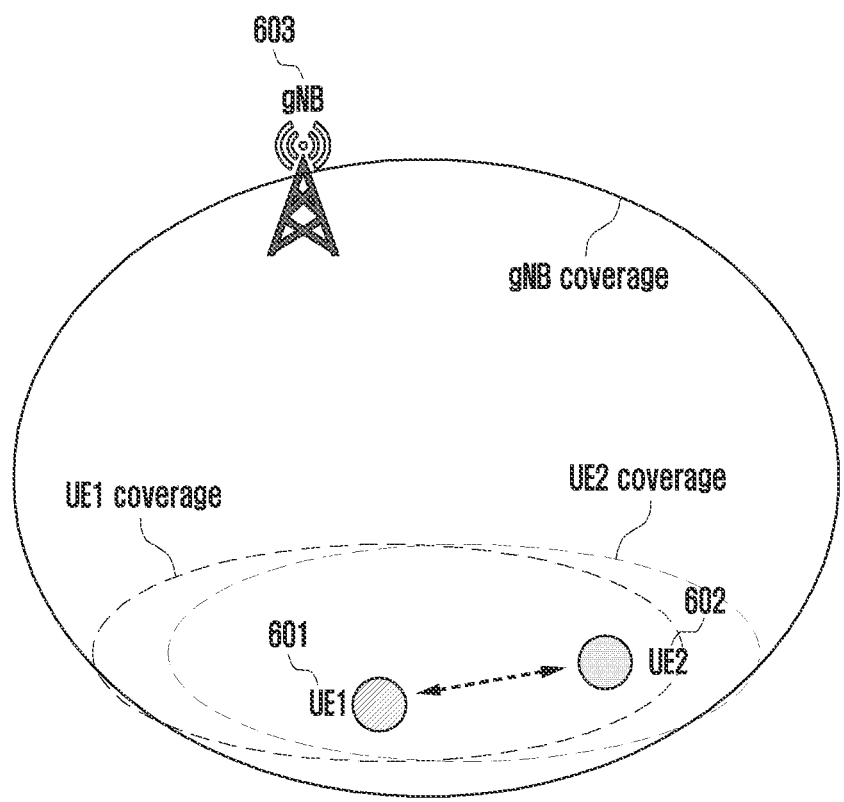
FIG. 6 illustrates V2X transmission power control according to an embodiment of the disclosure.

FIG. 6 illustrates V2X transmission power control according to an embodiment of the disclosure.

Referring to FIG. 6, in a case in which V2X UEs 601 and 602 are positioned close to each other, but positioned far from a gNB 603, when a downlink path loss value is used, unnecessary power consumption and interference in adjacent V2X UEs may be caused. Therefore, both methods above may be required.

That is, the gNB may configure which reference signal is used by a UE to estimate path loss (PL) in Equation 1 (that is, whether to use an SSS or a CSI-RS for estimating downlink path loss or whether to use a sidelink reference signal for estimating sidelink path loss).

Δ: Δ may indicate a transmit power control (TPC) command for closed-loop power control, or other RRC parameter. For example, Δ may indicate an offset value of transmission power according to a format of a sidelink control channel or a sidelink data channel. In another example, Δ may indicate a compensation value of transmission power depending on a spectral efficiency of a sidelink control channel or a sidelink data channel. That is, since as the spectral efficiency becomes higher (that is, a case of using less resources to transmit the same bit or a case of transmitting more bits by using the same amount of resources), the higher transmission power is required to be used, Δ may be a parameter which compensates a transmission power value depending on a spectral efficiency. In Equation 1, Δ is illustrated to be constituted by a single parameter, but may be constituted by a combination of the two or more parameters previously illustrated.

Figure 7:
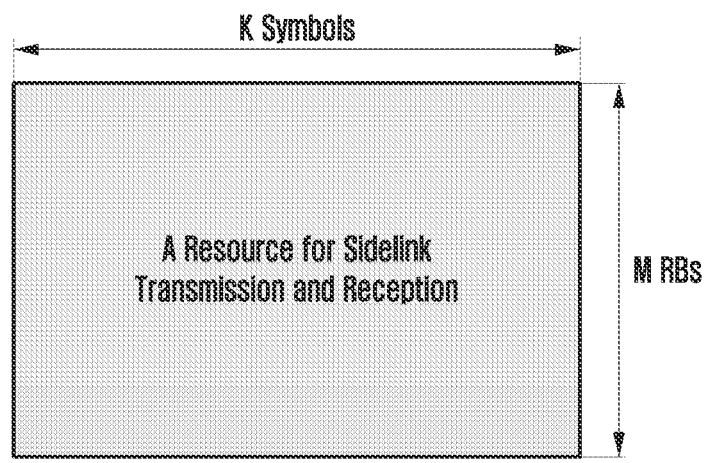
FIG. 7 is a diagram illustrating a sidelink resource for performing V2X communication according to an embodiment of the disclosure.

FIG. 7 is a diagram illustrating a sidelink resource for, by a V2X UE, performing V2X communication according to an embodiment of the disclosure.

Referring to FIG. 7, a sidelink resource may be constituted by K symbols on the time axis and be constituted by M resource blocks (RB) on the frequency axis. One resource block may be constituted by twelve sub-carriers. The K symbols may be physically continuous or logically continuous on the time axis (in a case of being logically continuous, the symbols may be physically discontinuous). Similarly, the M resource blocks may be physically continuous or logically continuous on the frequency axis (in a case of being logically continuous, the blocks may be physically discontinuous). Although not shown in FIG. 7, a V2X transmission UE may use the sidelink resource of FIG. 7 to transmit sidelink control information or data information. In addition, a V2X reception UE may use the sidelink resource of FIG. 7 to receive sidelink control information or data information. In another example, a V2X reception UE may use the sidelink resource of FIG. 7 to transmit sidelink feedback information to a V2X transmission UE. Referring to FIG. 7, values of K and M may be identical or vary depending on the time when sidelink control information or data information is transmitted. For example, when a V2X transmission UE transmits sidelink control information (or sidelink data information) at the time of T1, the values of K and M may be equal to or different from the values of K and M when a V2X transmission UE transmits sidelink control information (or sidelink data information) at the time of T2. Similarly, referring to FIG. 7, the values of K and M may be identical or vary depending on the time when a V2X reception UE receives sidelink control information or data information. For example, when a V2X reception UE receives sidelink control information (or sidelink data information) at the time of T1, the values of K and M may be equal to or different from the values of K and M when a V2X reception UE receives sidelink control information (or sidelink data information) at the time of T2. In addition, referring to FIG. 7, the values of K and M may be identical or vary depending on the time when a V2X reception UE transmits sidelink feedback information to a V2X transmission UE. For example, when a V2X reception UE transmits sidelink feedback information to a V2X transmission UE at the time of T1, the values of K and M may be equal to or different from the values of K and M when a V2X reception UE transmits sidelink feedback information to a V2X transmission UE at the time of T2.

Figure 8:
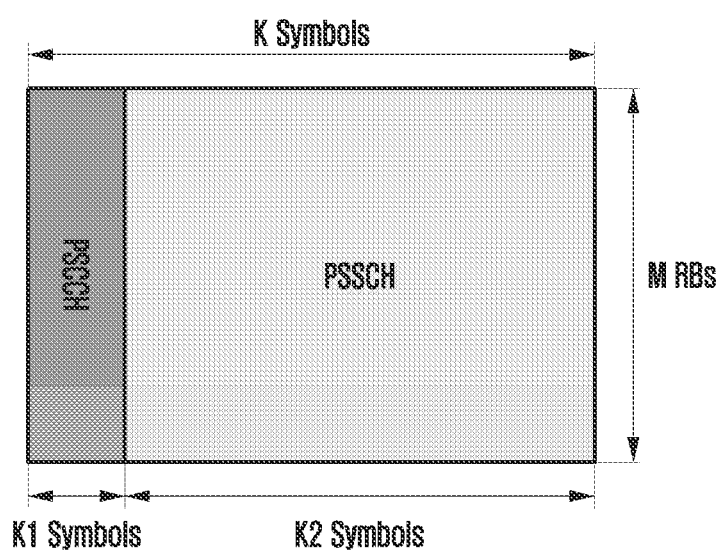
FIG. 8 illustrates a multiplexing method of a sidelink control channel and a sidelink data channel within a sidelink resource according to an embodiment of the disclosure.

FIG. 8 illustrates a multiplexing method of a sidelink control channel and a sidelink data channel within a sidelink resource according to an embodiment of the disclosure.

Referring to FIG. 8, multiplexing of a physical sidelink control channel (PSCCH) and a physical sidelink shared channel (PSSCH) on the time axis, that is, time division multiplexing (TDM) is illustrated. A PSCCH and a PSSCH may be constituted by the same number of resource blocks (M RBs) on the frequency axis, and may be constituted by K1 symbols and K2 symbols, respectively, on the time axis. Values of K1 and K2 may be equal to or different from each other. In addition, when the values of K1 and K2 are different from each other, the values may be K1>K2 or K1<K2. The V2X transmission UE may transmit sidelink control information (SCI) including time/frequency allocation information of the PSSCH, through the PSCCH. The V2X reception UE may receive and decode the PSCCH, and then may acquire the time/frequency allocation information of the PSSCH and decode the PSSCH. FIG. 8 illustrates the PSSCH constituted by the K2 symbols, which is physically continuously positioned after the PSCCH constituted by the K1 symbols, although they may not be physically continuously positioned (that is, the PSSCH may be logically continuously positioned without being physically continuously positioned after the PSCCH). In addition, although not shown in FIG. 8, a physical sidelink feedback channel (PSFCH) may exist within a sidelink resource constituted by K symbols. The PSCCH may be constituted by the K1 symbols, the PSSCH may be constituted by the K2 symbols and a guard symbol, and the PSFCH may be constituted by K3 symbols, and K1+K2+the number of guard symbols+K3 may be smaller than K. The guard symbol may be one or at least two OFDM symbols. The V2X reception UE may decode the PSSCH, and then may transmit the PSFCH including the result (that is, ACK/NACK information) to the V2X transmission UE.

At the i-th transmission time, the V2X UE using a sidelink resource structure of FIG. 8 may determine each of transmission power ($P_{PSCCH}$) of the PSCCH and transmission power ($P_{PSSCH}$) of the PSSCH through Equation 3.

$$P_{PSCCH}(i) = \min\{Pc\max(i), P_{0\_PSCCH} + \alpha_{PSCCH} * PL(q) + 10 \log 10(M*2^\mu) + \Delta_{PSCCH}(i)\}[dBm]$$

$$P_{PSSCH}(i) = \min\{Pc\max(i), P_{0\_PSSCH} + \alpha_{PSSCH} * PL(q) + 10 \log 10(M*2^\mu) + \Delta_{PSSCH}(i)\}[dBm] \quad \text{Equation 3}$$

In Equation 3, each parameter may indicate the following.

Pcmax(i): Pcmax(i) is a P-max value (when there is no base station, a preset value) indicating the maximum UE transmission output at the i-th transmission time and set by a base station through system information or RRC, and may be determined by a UE by means of a communication range and UE power class included in the UE. Since Pcmax(i) is a function of index "i", different transmission times may result in different Pcmax values.

$P_{0\_PSCCH}$, $P_{0\_PSSCH}$: $P_{0\_PSCCH}$ and $P_{0\_PSSCH}$ may indicate parameters (when there is no base station, preset values) set by a base station through system information or RRC in order to guarantee link quality of each of the PSCCH and the PSSCH. Values of $P_{0\_PSCCH}$ and $P_{0\_PSSCH}$ may be different from each other according to a sidelink scheduling method. For example, a gNB may schedule a sidelink transmission resource to the V2X transmission UE through downlink control information (DCI). It may be called a mode-1 resource allocation method. In another scheduling method, the gNB may configure resource pool information for sidelink transmission, and may determine a resource required for the V2X transmission UE to transmit sidelink control information and data information by itself. It may be called a mode-2 resource allocation method. Since in a case of mode-1, the gNB may manage a resource in a centralized manner, the gNB may control interference and resource collision problems between different V2X UEs. On the other hand, in a case of mode-2, since UEs manage a resource in a distributed manner, interference and resource collision problems between different V2X UEs may occur as compared to mode-1. Therefore, values of $P_0$ for sidelink transmission of mode-1 and mode-2 may be different. That is, $P_{0\_PSCCH}$ for mode-1 and $P_{0\_PSCCH}$ for mode-2 have different values. In addition, $P_{0\_PSSCH}$ for mode-1 and $P_{0\_PSSCH}$ for mode-2 have different values. In another example, as illustrated in FIGS. 2A and 2B, V2X UEs may perform V2X communication by using one of unicast, groupcast, and broadcast communication methods. Different link qualities may be required according to a communication method. For example, in a case of unicast communication, since a hybrid automatic repeat request (HARQ) ACK/NACK transmission is possible through a sidelink feedback channel, and the degradation of link quality may be reduced. However, in a case of broadcast communication, since sidelink feedback transmission is impossible, higher link quality may be required as compared to the unicast communication. Therefore, values of $P_{0\_PSCCH}$ and $P_{0\_PSSCH}$ may be different from each other according to communication methods including unicast, groupcast, and broadcast communication methods. As mentioned above, the values of $P_{0\_PSCCH}$ and $P_{0\_PSSCH}$ may be transmitted by a base station to a UE through system information or RRC configuration, or may be preset values when there is no base station. Therefore, the base station may not recognize a V2X communication method (unicast/groupcast/broadcast) that a sidelink UE is to transmit. The base station may not know when the UE should use values of $P_{0\_PSCCH}$ and $P_{0\_PSSCH}$ and which values of $P_{0\_PSCCH}$ and $P_{0\_PSSCH}$ should be used. In order to solve these problems, following operations can be assumed. One or more different associated resource pools for each communication method may exist. For example, the base station may configure, to the UE, one or more resource pools (for example, resource pool 1, resource pool 2) for unicast communication, one or more resource pools (for example, resource pool 3, resource pool 4) for groupcast communication, and one or more resource pools (for example, resource pool 5, resource pool 6) for broadcast communication. The values of $P_{0\_PSCCH}$ and $P_{0\_PSSCH}$ may vary depending on a resource pool. In another example, $P_{0\_PSCCH}$ may be constituted by $P_{0\_PSCCH1}$ and $P_{0\_PSCCH2}$, and $P_{0\_PSSCH}$ may be constituted by $P_{0\_PSSCH1}$ and $P_{0\_PSSCH2}$. All UEs within a cell may receive the same set value with respect to $P_{0\_PSCCH1}$ and $P_{0\_PSSCH1}$. Different V2X UEs within one cell may receive different set values with respect to $P_{0\_PSCCH2}$ and $P_{0\_PSSCH2}$. In the above example, $P_{0\_PSCCH1}$ and $P_{0\_PSSCH1}$ may be irrelevant to the communication type (that is, the same value is applied to the unicast, groupcast, broadcast communications), and $P_{0\_PSCCH2}$ and $P_{0\_PSSCH2}$ may vary depending on the communication type.

$\alpha_{PSCCH}$, $\alpha_{PSSCH}$: $\alpha_{PSCCH}$ and $\alpha_{PSSCH}$ are parameters for compensating path loss values of the PSCCH and the PSSCH, respectively, have values between 0 and 1, and may indicate values set by a base station through system information or RRC (when there is no base station, a preset value). For example, when $\alpha=1$, 100% of path loss may be compensated, and when $\alpha=0.8$, only 80% of path loss may be compensated. As in $P_{0\_PSCCH}$ and $P_{0\_PSSCH}$ illustrated above, $\alpha_{PSCCH}$ for mode-1 and $\alpha_{PSCCH}$ for mode-2 may have different values. In addition, $\alpha_{PSSCH}$ for mode-1 and $\alpha_{PSSCH}$ for mode-2 may have different values. Also, values of $\alpha_{PSCCH}$ and $\alpha_{PSSCH}$ may be set to vary depending on communication methods including the unicast, groupcast, and broadcast communication methods. To this end, $\alpha_{PSCCH}$ and $\alpha_{PSSCH}$ may have different values for each resource pool.

M: M may indicate the size of a frequency block allocated for sidelink transmission. Referring to FIG. 8, since both the PSCCH and the PSSCH use M frequency blocks, and the value of 10 log 10($M2^\mu$) may be used in Equation 3. $2^\mu$ may be a parameter for compensating a power spectral density (PSD) which vary depending on a subcarrier spacing. For example, a case of using a subcarrier spacing of 15 kHz may indicate that $\mu=0$. Even if the same number of frequency blocks are used, when the subcarrier spacing is doubled to 30 kHz, the PSD may be reduced by half compared with the case of using the subcarrier spacing of 15 kHz. Therefore, in order to compensate the PSD, power is required to be doubled. More specifically, for example, when two frequency blocks are used, 10 log 10($2 \times 2^0$)=3 dB is required for the subcarrier spacing of 15 kHz, whereas, in order to maintain the same PSD as that for the subcarrier spacing of 15 kHz, transmission power is required to be increased to 10 log 10($2 \times 2^1$)=6 dB for the subcarrier spacing of 30 kHz.

PL(q): PL(q) may indicate an estimated path loss value. The path loss value may be estimated by Equation 2. The index "q" may indicate an index of a reference signal used for path loss estimation. For example, when q=0, the V2X transmission UE may use an SSS that the gNB transmits, or an SSS and a DMRS transmitted through a PBCH in order to estimate the path loss value in Equation 3. When q=1, the V2X transmission UE may use a CSI-RS transmitted by the gNB in order to estimate the path loss value in Equation 3. When q=2, the V2X transmission UE may use a sidelink reference signal in order to estimate the path loss value in Equation 3. When path loss of Equation 3 is estimated by using the sidelink reference signal, one of the two methods mentioned in FIG. 3 may be used. That is, there are a method in which the V2X reception UE estimates sidelink path loss and transmits a result to the V2X transmission UE, and a method in which the V2X transmission UE uses RSRP having been measured and reported by the V2X reception UE to estimate sidelink path loss. The reference signal index "q" may be associated with each resource pool. That is, different resource pools may set different reference signal indices and the UE receiving the set indices may determine the application of downlink path loss with the base station or the application of sidelink path loss.

As mentioned above, upon receiving, from the base station, resource pool information, through system information and RRC configuration, the V2X UE may use $P_{0\_PSCCH}$, $P_{0\_PSSCH}$, $\alpha_{PSCCH}$, $\alpha_{PSSCH}$, and index information of a reference signal for path loss estimation, which are included in the resource pool information, and thus set transmission power values of the PSCCH and the PSSCH through Equation 3.

$\Delta_{PSCCH}$, $\Delta_{PSSCH}$: $\Delta_{PSCCH}$ and $\Delta_{PSSCH}$ may indicate TPC commands for closed-loop power control, or other RRC parameters. For example, $\Delta_{PSCCH}$ and $\Delta_{PSSCH}$ may indicate offset values of transmission power according to a format of a sidelink control channel or a sidelink data channel. In another example, $\Delta_{PSCCH}$ and $\Delta_{PSSCH}$ may indicate compensation values of transmission power according to a spectral efficiency of a sidelink control channel or a sidelink data channel. That is, since as the spectral efficiency becomes higher (that is, a case of using less resources to transmit the same bit or a case of transmitting more bits by using the same amount of resources), the higher transmission power is required to be used, $\Delta_{PSCCH}$ and $\Delta_{PSSCH}$ may be parameters which compensate transmission power values depending on a spectral efficiency. In Equation 3, $\Delta_{PSCCH}$ and $\Delta_{PSSCH}$ are illustrated to be constituted by a single parameter, but may be constituted by a combination of the two or more parameters previously illustrated. In another example, when closed-loop power control is not operated at sidelink, $\Delta_{PSCCH}$ and $\Delta_{PSSCH}$ may be omitted from Equation 3.

In the above example, UEs existing out of the coverage of the base station may not receive, from the base station, setting with respect to $P_{0\_PSCCH}$, $\alpha_{PSCCH}$, $\Delta_{PSCCH}$, and $P_{0\_PSSCH}$, $\alpha_{PSSCH}$, $\Delta_{PSSCH}$ parameters. Therefore, these UEs may use preset values with respect to the parameters. The preset values may include 0, 0 dB, or 0 dBm. The preset value may indicate a value input in a UE in the factory, or when the UE has existed within the coverage of the base station (the UE is positioned out of the coverage of the base station now), may indicate a value set by the base station.

In addition, in the above example, even though UEs exist within the coverage of the base station, exchange of parameters between the UEs may not be performed (assuming that exchange of parameters between the UEs is performed in a PC5 RRC layer) when a UE pairing for performing unicast communication is not formed (for example, before PC5 RRC configuration is completed in a PC5 RRC layer of UE A and UE B), or before a UE grouping for performing groupcast communication is formed. A transmission UE for the unicast and groupcast communications may not set a transmission power value based on sidelink path loss measurement. Therefore, like the mentioned method, the preset value may be used, or the values of $P_{0\_PSCCH}$, $\alpha_{PSCCH}$, $\Delta_{PSCCH}$ and $P_{0\_PSSCH}$, $\alpha_{PSSCH}$, $\Delta_{PSSCH}$, which are transmitted from the base station through RRC configuration and system information of the base station, may be used. The values of $P_{0\_PSCCH}$, $\alpha_{PSCCH}$, $\Delta_{PSCCH}$ and $P_{0\_PSSCH}$, $\alpha_{PSSCH}$, $\Delta_{PSSCH}$ which are used at this time may be different from the values of $P_{0\_PSCCH}$, $\alpha_{PSCCH}$, $\Delta_{PSCCH}$ and $P_{0\_PSSCH}$, $\alpha_{PSSCH}$, $\Delta_{PSSCH}$ which are used after PCT RRC configuration. PL(q) that the transmission UE uses in Equation 3 before PC5 RRC configuration may indicate a path loss value with respect to Uu link between the base station and the transmission UE, not the sidelink path loss value.

In another example, when in the example above, the PSCCH, the PSSCH, and the PSFCH should be transmitted before PC5 RRC configuration between UEs, which are to perform the unicast or groupcast communication, is completed, the V2X UE may use the preset transmission power value (for example, [X] dBm) or the transmission power value set by the base station. The transmission power values preset for transmitting the PSCCH, the PSSCH, and the PSFCH (or the transmission power values set by the base station) may be different from each other.

In another example, the preset transmission power values or the transmission power values set by the base station, of the PSCCH, the PSSCH, and the PSFCH may be expressed as the transmission power value and the offset value with respect to one channel. For example, when the transmission power values of the PSCCH, the PSSCH, and the PSFCH are preset, the transmission power value of the PSCCH may be set to be [X] dBm, and the offset value for transmission power of the PSSCH and the PSFCH may be set to be +/−[Y] dB (or dBm), based on the transmission power value of the PSCCH. It may be equally applied even when the transmission power values of the PSCCH, the PSSCH, and the PSFCH are set by the base station.

Figure 9:
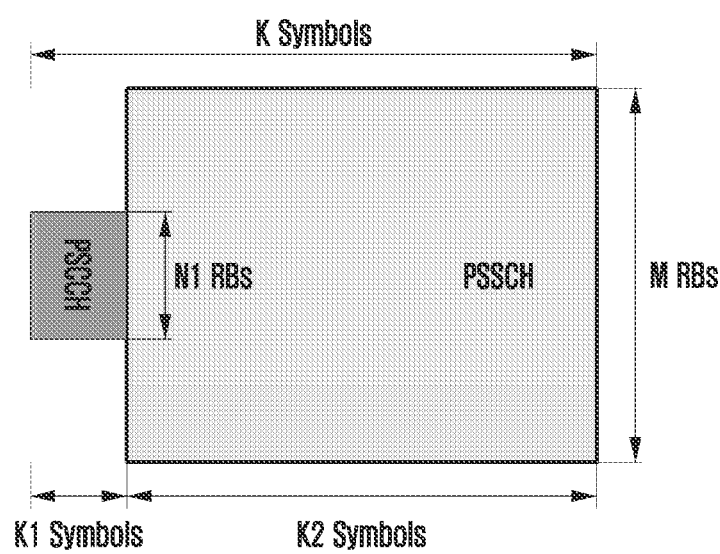
FIG. 9 illustrates a multiplexing method of a sidelink control channel and a sidelink data channel within a sidelink resource according to an embodiment of the disclosure.

FIG. 9 illustrates a multiplexing method of a sidelink control channel and a sidelink data channel within a sidelink resource according to an embodiment of the disclosure.

Referring to FIG. 9, FIG. 9 illustrates that a PSCCH and a PSSCH are time-division-multiplexed, but unlike FIG. 8, illustrates that the PSCCH and the PSSCH are constituted by different numbers of resource blocks on the frequency axis. That is, on the frequency axis, the PSCCH may be constituted by N1 frequency blocks, and the PSSCH may be constituted by M frequency blocks. N1 may be smaller than M (N1<M). Meanwhile, similar to FIG. 8, on the time axis, the PSCCH may be constituted by K1 symbols, and the PSSCH may be constituted by K2 symbols. The values of K1 and K2 are equal to or different from each other. In addition, when the values of K1 and K2 are different from each other, the values may be K1>K2 or K1<K2. The V2X transmission UE may transmit sidelink control information (SCI) including time/frequency allocation information of the PSSCH through the PSCCH. The V2X reception UE may receive and decode the PSCCH, and then may acquire the time/frequency allocation information of the PSSCH and decode the PSSCH. FIG. 9 illustrates the PSSCH constituted by the K2 symbols, which is physically continuously positioned after the PSCCH constituted by the K1 symbols, although they may not be physically continuously positioned (that is, the PSSCH may be logically continuously positioned without being physically continuously positioned after the PSCCH). In addition, although not shown in FIG. 9, a PSFCH may exist within a sidelink resource constituted by K symbols. The PSCCH may be constituted by the K1 symbols, the PSSCH may be constituted by the K2 symbols and a guard symbol, and the PSFCH may be constituted by K3 symbols, and K1+K2+the number of guard symbols+K3 may be equal to or smaller than K. The guard symbol may be one or at least two OFDM symbols. In addition, on the frequency axis of the PSFCH, the size of resource blocks may be equal to or different from the size of resource blocks of the PSCCH and the PSSCH. The V2X reception UE may decode the PSSCH, and then transmit the PSFCH including the result (that is, ACK/NACK information) to the V2X transmission UE.

At the i-th transmission time, the V2X UE using a sidelink resource structure of FIG. 9 may determine each of transmission power ($P_{PSCCH}$) of the PSCCH and transmission power ($P_{PSSCH}$) of the PSSCH through Equation 4.

$P_{PSCCH}(i)=\min\{Pc\ \max(i), P_{0\_PSCCH}+\alpha_{PSCCH}*PL(q)+10\log 10(N1*2^\mu)+\Delta_{PSCCH}(i)\}$[dBm]

$P_{PSSCH}(i)=\min\{Pc\ \max(i), P_{0\_PSSCH}+\alpha_{PSSCH}*PL(q)+10\log 10(M*2^\mu)+\Delta_{PSSCH}(i)\}$[dBm]   Equation 4

In Equation 4, each parameter may be interpreted to be the same as Equation 3 illustrated in FIG. 8. Equation 4 differs from Equation 3 in that the size of frequency blocks allocated for the PSCCH is different. That is, it is illustrated that in Equation 4, N1 frequency blocks are used, and in Equation 3, M frequency blocks are used.

A definition and a method of use of parameters including $P_{0\_PSCCH}$, $\alpha_{PSCCH}$, $\Delta_{PSCCH}$ and $P_{0\_PSSCH}$, $\alpha_{PSSCH}$, $\Delta_{PSSCH}$ which are used in Equation 4 may be equal to the definition and the embodiment described in Equation 3 of FIG. 8. For example, the transmission power parameters used in Equation 4 may use a set value that the transmission UE receives from the base station or use a value preset to the UE by means of the methods mentioned in FIGS. 8 and 9. For example, the UEs exiting out of the coverage of the base station may not receive, from the base station, setting with respect to transmission power parameters. Therefore, these UEs may use preset values with respect to the parameters. The set values may include 0, 0 dB, or 0 dBm. The preset value may indicate a value input in a UE in the factory or when the UE has existed within the coverage of the base station (the UE is positioned out of the coverage of the base station now), may indicate a value set by the base station.

In another example, even though UEs exist within the coverage of the base station, exchange of parameters between UEs may not be performed (assuming that exchange of parameters between the UEs is performed in a PC5 RRC layer) when a UE pairing for performing unicast communication is not formed (for example, before PC5 RRC configuration is completed in a PC5 RRC layer of UE A and UE B), or before a UE grouping for performing groupcast communication is formed. A transmission UE for the unicast and groupcast communications may not set a transmission power value based on a sidelink path loss signal. To this end, the preset value with respect to the mentioned parameters may be used, or the value transmitted from the base station through RRC configuration and system information of the base station may be used. The values of the parameters used at this time may be different from the values of the parameters used after PC5 RRC configuration. PL(q) that the transmission UE uses before PC5 RRC configuration in Equation 7, Equation 8, Equation 9, Equation 10, and Equation 11 may indicate a path loss value with respect to Uu link between the base station and the transmission UE, not the sidelink path loss value. In addition, when the UE uses the preset parameters, each of the parameters may include the value of 0, 0 dB, or 0 dBm.

In another example, when in the example above, the PSCCH, the PSSCH, and the PSFCH should be transmitted before PC5 RRC configuration between UEs, which are to perform the unicast or groupcast communication, is completed, the V2X UE may use the preset transmission power value (for example, [X] dBm) or the transmission power value set by the base station. The transmission power values preset for transmitting the PSCCH, the PSSCH, and the PSFCH (or the transmission power values set by the base station) may be different from each other.

In another example, the preset transmission power values or the transmission power values set by the base station, of the PSCCH, the PSSCH, and the PSFCH may be expressed as the transmission power value and the offset value with respect to one channel. For example, when the transmission power values of the PSCCH, the PSSCH, and the PSFCH are preset, the transmission power value of the PSCCH may be set to be [X] dBm, and the offset value for transmission power of the PSSCH and the PSFCH may be set to be +/−[Y] dB (or dBm), based on the transmission power value of the PSCCH. It may be equally applied even when the transmission power values of the PSCCH, the PSSCH, and the PSFCH are set by the base station.

Figure 10:
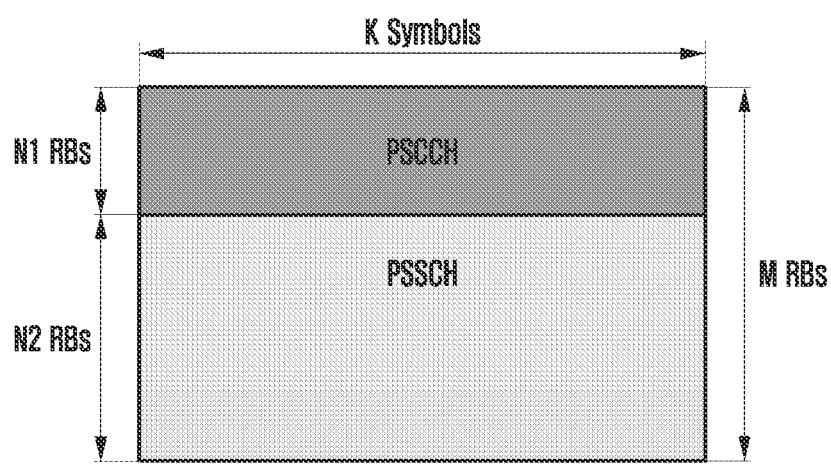
FIG. 10 illustrates a multiplexing method of a sidelink control channel and a sidelink data channel within a sidelink resource according to an embodiment of the disclosure.

FIG. 10 illustrates a V2X frame structure according to an embodiment of the disclosure.

Referring to FIG. 10, unlike FIGS. 8 and 9, illustrates that a PSCCH and a PSSCH are frequency-division-multiplexed on the frequency axis, and similar to FIG. 9, illustrates that the PSCCH and the PSSCH are constituted by different numbers of resource blocks. That is, on the frequency axis, the PSCCH may be constituted by N1 frequency blocks and the PSSCH may be constituted by M frequency blocks, and on the time axis, the PSCCH and the PSSCH may be constituted by the same number of symbols. N1 may be equal to or different from M. The V2X transmission UE may transmit sidelink control information (SCI) including time/frequency allocation information of the PSSCH through the PSCCH. The V2X reception UE may receive and decode the PSCCH, and then may acquire the time/frequency allocation information of the PSSCH and decode the PSSCH. FIG. 10 illustrates the PSSCH constituted by (M−N2) frequency blocks, which is physically continuously positioned after the PSCCH constituted by the N1 frequency blocks, although they may not be physically continuously positioned (that is, the PSSCH may be logically continuously positioned without being physically continuously positioned after the PSCCH). In addition, although not shown in FIG. 10, a PSFCH may exist in the later part of the K symbols. More specifically, the PSCCH and the PSSCH may be constituted by the K1 symbols and a guard symbol, and the PSFCH may be constituted by the K2 symbols, and K1+the number of guard symbols+K2 may be equal to or smaller than K. The guard symbol may be one or at least two OFDM symbols. The V2X reception UE may decode the PSSCH, and then transmit the PSFCH including the result (that is, ACK/NACK information) to the V2X transmission UE.

At the i-th transmission time, the V2X UE using a sidelink resource structure of FIG. 10 may determine each of transmission power ($P_{PSCCH}$) of the PSCCH and transmission power ($P_{PSSCH}$) of the PSSCH through Equation 5.

$$P_{PSCCH}(i)=\gamma 1+\min\{Pc\max(i), P_{0\_PSCCH}+\alpha_{PSCCH}*PL(q)+\beta+\Delta_{PSCCH}(i)\}[\text{dBm}]$$

$$P_{PSSCH}(i)=\gamma 2+\min\{Pc\max(i), P_{0\_PSSCH}+\alpha_{PSSCH}*PL(q)+\beta+\Delta_{PSSCH}(i)\}[\text{dBm}] \quad \text{Equation 5}$$

In Equation 5, each parameter indicates the following.

γ1, γ2: Referring to FIG. 10, since the PSCCH and the PSSCH are frequency-division-multiplexed, the PSCCH and the PSSCH may be simultaneously transmitted at the i-th time. Therefore, the transmission power of the V2X UE is required to be properly distributed to the PSCCH and the PSSCH at the i-th sidelink transmission time. γ1 and γ2 indicate values which distribute the power that the PSCCH and the PSSCH use and may be expressed as shown in Equation 6.

$$\gamma 1=10\log 10\{(10^{\wedge}(\varepsilon/10)\times N1)/[(M-N1)+10^{\wedge}(\varepsilon/10)\times N1]\} \text{ [dB]}$$

$$\gamma 2=10\log 10\{[10^{\wedge}(\varepsilon/10)\times(M-N1)]/[(M-N1)+10^{\wedge}(\varepsilon/10)\times N1]\} \text{ [dB]} \quad \text{Equation 6}$$

ε indicates a value representing a difference between PSDs of the PSCCH and the PSSCH, and may have a unit of [dB]. For example, when the PSCCH and the PSSCH use the same PSD, ε may be 0. Generally, a control channel is required to guarantee the reliability higher than that of a data channel. In that case, the PSCCH has the higher PSD than that of the PSSCH. For example, when ε=3, it may indicate that the PSCCH has the PSD higher than that of the PSSCH by 3 dB. The fixed value is always used as the value of ε (for example, ε=3) or the base station may transmit the value of ε to the UE through system information or RRC configuration. In that case, as illustrated in FIGS. 8 and 9, different values of F may be set for each resource pool.

In Equation 5, β may indicate 10 log 10[(M−N1)+10^(ε/10)×N1] [dB].

In Equation 5, a definition and a method of use of parameters other than γ1, γ2, and β may be the same as what illustrated in FIGS. 8 and 9. For example, with respect to the transmission power parameters used in Equation 5, the transmission UE may use the value set by the base station or use the value preset to the UE, by means of the methods mentioned in FIGS. 8 to 10. For example, UEs existing out of the coverage of the base station may not receive sidelink transmission power parameters set by the base station. Therefore, these UEs may use values preset with respect to the parameters. The set values may include 0, 0 dB, or 0 dBm. The preset value may indicate a value input in a UE at the factory or, when the UE has existed within the coverage of the base station (the UE is positioned out of the coverage of the base station now), may indicate a value set by the base station.

In another example, even though UEs exist within the coverage of the base station, exchange of parameters between the UEs, which are to perform unicast/groupcast communication, may not be performed when an unicast UE pair for performing unicast communication is not formed (for example, a case in which PC5 RRC configuration is not completed), or before a UE grouping for performing groupcast communication is formed. Therefore, the transmission UE for unicast and groupcast communications may not set a sidelink transmission power value based on a sidelink path loss value. To this end, with respect to the mentioned parameters, a preset value may be used, or a value transmitted from the base station through RRC configuration and system information of the base station may be used. The values of the parameters used at this time may be different from the values of the parameters used after PC5 RRC configuration. PL(q) that the transmission UE uses before PC5 RRC configuration in Equation 7, Equation 8, Equation 9, Equation 10, and Equation 11 may indicate a path loss value with respect to Uu link between the base station and the transmission UE, not the sidelink path loss value. In addition, when the UE uses the preset parameters, each of the parameters may include the value of 0, 0 dB, or 0 dBm.

In another example, the preset transmission power values or the transmission power values set by the base station, of the PSCCH, the PSSCH, and the PSFCH may be expressed as the transmission power value and the offset value with respect to one channel. For example, when the transmission power values of the PSCCH, the PSSCH, and the PSFCH are preset, the transmission power value of the PSCCH may be set to be [X] dBm, and the offset value for transmission power of the PSSCH and the PSFCH may be set to be +/−[Y] dB (or dBm), based on the transmission power value of the PSCCH. It may be equally applied even when the transmission power values of the PSCCH, the PSSCH, and the PSFCH are set by the base station.

Figure 11:
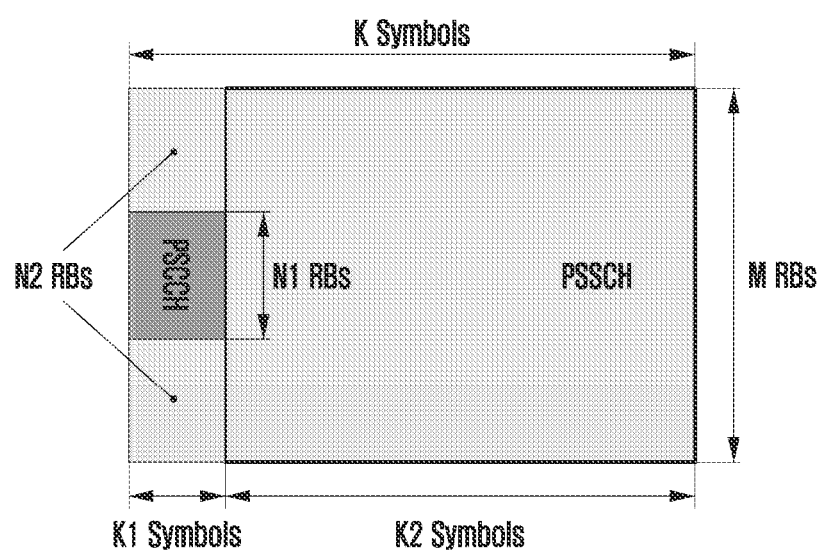
FIG. 11 illustrates a multiplexing method of a sidelink control channel and a sidelink data channel within a sidelink resource according to an embodiment of the disclosure.

FIG. 11 illustrates a V2X frame structure according to an embodiment of the disclosure.

Referring to FIG. 11, which is considered to be a combination of FIGS. 9 and 10, it illustrates that a PSCCH and a PSSCH are frequency-division-multiplexed in K1 symbols, and in remaining K2 symbols, only the PSSCH is transmitted without PSCCH transmission. The PSCCH may be constituted by N1 frequency blocks on the frequency axis, and may be constituted by K1 symbols on the time axis. The PSSCH may be constituted by N2 frequency blocks during the length of the K1 symbols, and may be frequency-divided with the PSCCH. The PSSCH are not frequency-divided with the PSCCH during the length of the K2 symbols, and may be constituted by M frequency blocks. The sum of N1 and N2 may be equal to or different from M. FIG. 11 illustrates that the PSCCH constituted by the N1 frequency blocks and the PSSCH constituted by (M−N2) frequency blocks are physically continuously positioned, but they may not be physically continuously positioned (that is, they may be logically continuously positioned without being physically continuously positioned). Meanwhile, the values of K1 and K2 may be equal to or different from each other, and when the values of K1 and K2 are different from each other, it may be K1>K2 or K1<K2. The V2X transmission UE may transmit sidelink control information including time/frequency allocation information of the PSSCH through the PSCCH. The V2X reception UE may receive and decode the PSCCH, and then may acquire the time/frequency allocation information of the PSSCH and decode the PSSCH. FIG. 11 illustrates the PSSCH constituted by the K2 symbols, which is physically continuously positioned after the PSCCH constituted by the K1 symbols, although they may not be physically continuously positioned (that is, the PSSCH may be logically continuously positioned without being physically continuously positioned after the PSCCH).

Although not shown in FIG. 11, a PSFCH may exist within a sidelink resource constituted by K symbols. The PSCCH may be constituted by the K1 symbols, the PSSCH may be constituted by the K1+K2 symbols and a guard symbol, and the PSFCH may be constituted by K3 symbols, and K1+K2+the number of guard symbols+K3 may be equal to or smaller than K. The guard symbol may be one or at least two OFDM symbols. In addition, on the frequency axis of the PSFCH, the size of resource blocks may be equal to or different from the size of resource blocks of the PSCCH and the PSSCH. The V2X reception UE may decode the PSSCH, and then transmit the PSFCH including the result (that is, ACK/NACK information) to the V2X transmission UE.

At the i-th transmission time, the V2X UE using a sidelink resource structure of FIG. 11 may determine transmission power ($P_{PSCCH}$) of the PSCCH and transmission power ($P_{PSSCH}$) of the PSSCH by using one of methods mentioned below.

Method 1) Parameters for Determining $P_{PSCCH}$ and $P_{PSSCH}$ are Independently Set.

Method 1-1) Scalding Down or Scaling Up of Transmission Power

A UE may temporarily calculate values of $P_{PSCCH}$ and $P_{PSSCH}$ through Equation 7.

$$P_{PSCCH}(i) = P_{0\_PSCCH} + \alpha_{PSCCH} * PL(q) + 10 \log 10(N1*2^\mu) + \Delta_{PSCCH}(i) \text{ [dBm]}$$

$$P_{PSSCH-1}(i) = P_{0\_PSSCH} + \alpha_{PSSCH} * PL(q) + 10 \log 10(N2*2^\mu) + \Delta_{PSSCH}(i) \text{ [dBm]}$$

$$P_{PSSCH-2}(i) = P_{0\_PSSCH} + \alpha_{PSSCH} * PL(q) + 10 \log 10(M*2^\mu) + \Delta_{PSSCH}(i) \text{ [dBm]} \quad \text{Equation 7}$$

In Equation 7, referring to FIG. 11, $P_{PSSCH-1}$ may indicate transmission power of the PSSCH during a section of K1 symbols when the PSCCH and the PSSCH are frequency-divided and transmitted. Referring to FIG. 11, $P_{PSSCH-2}$ may indicate transmission power of the PSSCH during a section of K2 symbols when only the PSCCH is transmitted. Within one sidelink transmission time (for example, sidelink transmission time i), when transmission power of symbols of the same channel is changed, a problem may occur. Specifically, in FIG. 11, the PSCCH and the PSSCH are simultaneously transmitted during the section of K1 symbols, and only the PSSCH is transmitted during the section of K2 symbols. As illustrated in Equation 7, the PSCCH and the PSSCH may use different transmission power control parameters. Therefore, at the sidelink transmission time i, the transmission power for transmitting the K1 symbols may be different from the transmission power for transmitting the K2 symbols. In that case, due to the phase shift and discontinuity, a transmission signal may be transmitted while being distorted. In order to solve this problem, it is required to set the transmission power used for transmitting the K1 symbols and the transmission power used for transmitting the K2 symbols to have the same value, and it may be achieved through Equation 8 or Equation 9.

$$P_{Sidelink}(i)=\min\{Pc\max(i), P_{PSCCH}(i)+P_{PSSCH-1}(i), P_{PSSCH-2}(i)\}$$ Equation 8

$$P_{Sidelink}(i)=\min\{Pc\max(i), \max[P_{PSCCH}(i)+P_{PSSCH-1}(i), P_{PSSCH-2}(i)]\}$$ Equation 9

In Equation 8 and Equation 9, each parameter may indicate the following.

$P_{Sidelink}(i)$: Sidelink transmission power at the i-th sidelink transmission time Pcmax(i): Pcmax(i) is equal to what described in Equation 1, Equation 3, Equation 4, Equation 5, and Equation 6.

$P_{PSCCH}(i)$: PSCCH transmission power at the i-th sidelink transmission time $P_{PSSCH-1}(i)$: PSSCH transmission power in symbols during which the PSCCH and the PSSCH are frequency-divided and transmitted at the i-th sidelink transmission time At the i-th sidelink transmission time, a case of $P_{PSCCH}(i)+P_{PSSCH-1}(i)<P_{PSSCH-2}(i)<Pcmax(i)$ may occur.

Transmission power used for the i-th sidelink transmission may be $P_{Sidelink}(i)=P_{PSCCH}(i)+P_{PSSCH-1}(i)$ by Equation 8, and may scale down $P_{PSSCH-2}(i)$ obtained by Equation 7 by w1 such that $P_{PSCCH}(i)+P_{PSSCH-1}(i)=w1*P_{PSSCH-2}(i)$ is satisfied. w1 may have a value which is larger than 0 and equal to 1, or smaller than 1.

In a case of using Equation 9, transmission power used for the i-th sidelink transmission may be $P_{Sidelink}(i)=P_{PSSCH-2}(i)$, and may scale up $P_{PSCCH}(i)+P_{PSSCH-1}(i)$ obtained by Equation 7 by w1 such that $P_{PSSCH-2}(i)=w1[P_{PSCCH}(i)+P_{PSSCH-1}(i)]$ is satisfied. w1 may have a value larger than 1.

In another example, at the i-th sidelink transmission time, a case of $P_{PSSCH-2}(i)<P_{PSCCH}(i)+P_{PSSCH-1}(i)<Pcmax(i)$ may occur.

Transmission power used for the i-th sidelink transmission may be $P_{Sidelink}(i)=P_{PSSCH-2}(i)$ by Equation 8, and may scale down $P_{PSCCH}(i)+P_{PSSCH-1}(i)$ obtained by Equation 7 by w1 such that $P_{PSSCH-2}(i)=w1[P_{PSCCH}(i)+P_{PSSCH-1}(i)]$ is satisfied. w1 may have a value which is larger than 0 and equal to 1, or smaller than 1.

Transmission power used for the i-th sidelink transmission may be $P_{Sidelink}(i)=P_{PSCCH}(i)+P_{PSSCH-1}(i)$ by Equation 9, and may scale up $P_{PSSCH-2}(i)$ obtained by Equation 7 by w1 such that $P_{PSCCH}(i)+P_{PSSCH-1}(i)=w1*P_{PSSCH-2}(i)$ is satisfied. w1 may have a value larger than 1.

Method 1-2) Sidelink Transmission Power is Determined by the Transmission Power of the K1 Symbols.

Method 1-2 is the same as method 1-1 in that the UE temporarily calculates values of $P_{PSCCH}$ and $P_{PSSCH-1}$ through Equation 7. However, unlike method 1-1, in method 1-2, $P_{PSSCH-2}$ mentioned in Equation 7 may not be calculated. Therefore, transmission power at the i-th sidelink transmission time may be determined as shown in Equation 10.

$$P_{Sidelink}(i)=\min\{Pc\max(i), P_{PSCCH}(i)+P_{PSSCH-1}(i)\}$$ Equation 10

When sizes of frequency blocks in the K1 symbols and the K2 symbols are different, or since values of transmission power control parameters are different, transmission power values of the K1 symbols and the K2 symbols are different, as previously illustrated, $P_{PSSCH-2}(i)$ may be scaled up or scaled down.

Method 1-3) Sidelink Transmission Power is Determined by the Transmission Power of the K2 Symbols.

In method 1-3, transmission power at the i-th sidelink transmission time may be determined by Equation 11.

$$P_{Sidelink}(i)=\min\{Pc\max(i), P_{PSSCH-2}(i)\}$$ Equation 11

In Equation 11, $P_{PSSCH-2}(i)$ may be equal to $P_{PSSCH-2}(i)$ illustrated in Equation 7. The UE may use $P_{PSSCH-2}(i)$ obtained by Equation 11 to calculate transmission powers of the PSCCH and PSSCH transmitted in the section of K1 symbols. More specifically, through $P_{PSSCH-2}(i)$ obtained by Equation 11, and $P_{PSCCH}(i)$ and $P_{PSSCH-1}(i)$ illustrated in Equation 7, temporary transmission powers of the PSCCH and the PSSCH in the section of K1 symbols may be calculated and values of X1, X2, and Y may be calculated as shown in Equation 12.

$$X1=10^{[P_{PSCCH}(i)/10]}, X2=10^{[P_{PSSCH-1}(i)/10]}, Y=10^{[P_{Sidelink}(i)/10]}$$ Equation 12

The UE may determine transmission powers of the PSCCH and the PSSCH transmitted in the section of K1 symbols through Equation 13, by using the values of X1, X2, and Y obtained by Equation 12.

$$P_{PSCCH}(i)=10\log 10[X1*Y/(X1+X2)]$$

$$P_{PSSCH-1}(i)=10\log 10[X2*Y/(X1+X2)]$$ Equation 13

Method 2) Parameters for Determining $P_{PSCCH}$ and $P_{PSSCH}$ are Set to be the Same.

In a case of method 2, since parameters for determining transmission powers of the PSCCH and the PSSCH are set to be the same, the parameters of the PSCCH and the PSSCH, which are illustrated in Equation 3, Equation 4, Equation 5, and Equation 7, may be the same. More specifically, at the i-th sidelink transmission time, it may be indicated that $P_{0\_PSCCH}=P_{0\_PSSCH}=P_0$, $\alpha_{PSCCH}=\alpha_{PSSCH}=\alpha$, and $\Delta_{PSCCH}=\Delta_{PSSCH}=\Delta$. Another precondition of method 2 is that $P_{PSCCH}$ and $P_{PSSCH}$ may have the fixed power density offset or the set power density offset. Under these assumptions, method 2 may have two methods described below.

Method 2-1) Sidelink Transmission Power is Determined by the Transmission Power of the K1 Symbols.

At the section of the K1 symbols during which the PSCCH and the PSSCH are frequency-divided and transmitted at the i-th sidelink transmission time, $P_{PSCCH}$ and $P_{PSSCH-1}$ may be determined by Equation 14.

$$P_{PSCCH}(i)=\gamma 1+P_0+\alpha PL(q)+\beta+\Delta(i) \text{ [dBm]}$$

$$P_{PSSCH-1}(i)=\gamma 2+P_0+\alpha PL(q)+\beta+\Delta(i) \text{ [dBm]}$$ Equation 14

In Equation 14, $\gamma 1$ and $\gamma 2$ may be equal to what defined in Equation 6. In Equation 14, $\beta$ may indicate $10\log 10[(M-N1)+10^{(\epsilon/10)}\times N1]$ [dB]. Transmission power at the i-th sidelink transmission time may be calculated as shown in Equation 10, by using Equation 14. In method 2-1, when sizes of frequency blocks in the K1 symbols and the K2 symbols are different, the value of $P_{PSCCH}(i)+P_{PSSCH-1}(i)$ may be different from $P_{PSSCH-2}(i)$. In that case, as illustrated above, $P_{PSSCH-2}(i)$ may be scaled up or scaled down.

Method 2-2) Sidelink Transmission Power is Determined by the Transmission Power of the K2 Symbols.

Unlike method 2-1, at the section of K2 symbols during which the PSCCH and the PSSCH are not frequency-divided at the i-th sidelink transmission time, sidelink transmission power may be determined by Equation 11. $P_{Sidelink}(i)$ having been determined by Equation 11 may be distributed by Equation 12 and Equation 13. Meanwhile, with respect to the transmission power parameters used in Equation 7, Equation 8, Equation 9, Equation 10, and Equation 11, the transmission UE may use the value set by the base station or use the value preset to the UE, by means of the methods mentioned in FIGS. 8 to 11. For example, UEs existing out of the coverage of the base station may not receive setting with respect to transmission power parameters from the base station. Therefore, these UEs may use values preset with respect to the parameters. The set values may include 0, 0 dB, or 0 dBm. The preset value may indicate a value input in a UE at the factory or, when the UE has existed within the coverage of the base station (the UE is positioned out of the coverage of the base station now), may indicate a value set by the base station. In another example, even though UEs exist within the coverage of the base station, exchange of parameters between the UEs, which are to perform unicast/ groupcast communication, may not be performed when an unicast UE pair for performing unicast communication is not formed (for example, a case in which PC5 RRC configuration is not completed), or before a UE grouping for performing groupcast communication is formed. Therefore, the transmission UE for unicast and groupcast communications may not set a transmission power value. To this end, with respect to the mentioned parameters, a preset value may be used, or a value transmitted from the base station through RRC configuration and system information of the base station may be used. The values of the parameters used at this time may be different from the values of the parameters used after PC5 RRC configuration. PL(q) that the transmission UE uses before PC5 RRC configuration in Equation 7, Equation 8, Equation 9, Equation 10, and Equation 11 may indicate a path loss value with respect to Uu link between the base station and the transmission UE, not the sidelink path loss value. In addition, when the UE uses the preset parameters, each of the parameters may include the value of 0, 0 dB, or 0 dBm. In another example, the preset transmission power values or the transmission power values set by the base station, of the PSCCH, the PSSCH, and the PSFCH may be expressed as the transmission power value and the offset value with respect to one channel. For example, when the transmission power values of the PSCCH, the PSSCH, and the PSFCH are preset, the transmission power value of the PSCCH may be set to be [X] dBm, and the offset value for transmission power of the PSSCH and the PSFCH may be set to be +/−[Y] dB (or dBm), based on the transmission power value of the PSCCH. It may be equally applied even when the transmission power values of the PSCCH, the PSSCH, and the PSFCH are set by the base station.

Figure 12:
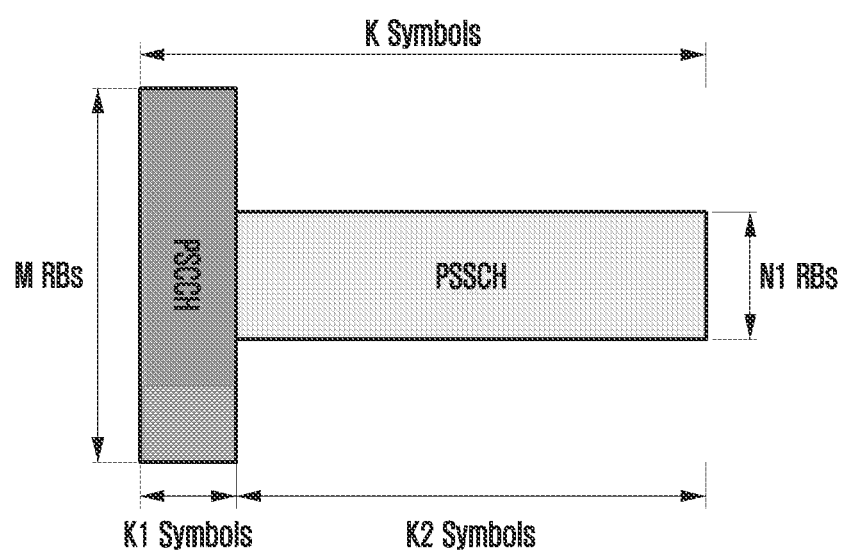
FIG. 12 illustrates a multiplexing method of a sidelink control channel and a sidelink data channel within a sidelink resource according to an embodiment of the disclosure.

FIG. 12 illustrates a V2X frame structure according to an embodiment of the disclosure.

Referring to FIG. 12, similar to FIGS. 8 and 9, it illustrates that a PSCCH and a PSSCH are time-division-multiplexed, but unlike FIG. 8, illustrates that the PSCCH and the PSSCH are constituted by different numbers of resource blocks on the frequency axis. That is, on the frequency axis, the PSCCH may be constituted by M frequency blocks, and the PSSCH may be constituted by N1 frequency blocks (M>N1). Meanwhile, similar to FIGS. 8 and 9, on the time axis, the PSCCH may be constituted by K1 symbols, and the PSSCH may be constituted by K2 symbols. The values of K1 and K2 may be equal to or different from each other. In addition, when the values of K1 and K2 are different from each other, the values may be K1>K2 or K1<K2. The V2X transmission UE may transmit sidelink control information (SCI) including time/frequency allocation information of the PSSCH through the PSCCH. The V2X reception UE may receive and decode the PSCCH, and then may acquire the time/frequency allocation information of the PSSCH and decode the PSSCH. FIG. 12 illustrates the PSSCH constituted by the K2 symbols, which is physically continuously positioned after the PSCCH constituted by the K1 symbols, although they may not be physically continuously positioned (that is, the PSSCH may be logically continuously positioned without being physically continuously positioned after the PSCCH). In addition, although not shown in FIG. 12, a PSFCH may exist within a sidelink resource constituted by K symbols. The PSCCH may be constituted by the K1 symbols, the PSSCH may be constituted by the K2 symbols and a guard symbol, and the PSFCH may be constituted by K3 symbols, and K1+K2+the number of guard symbols+K3 may be equal to or smaller than K. The guard symbol may be one or at least two OFDM symbols. In addition, on the frequency axis of the PSFCH, the size of resource blocks may be equal to or different from the size of resource blocks of the PSCCH and the PSSCH. The V2X reception UE may decode the PSSCH, and then transmit the PSFCH including the result (that is, ACK/NACK information) to the V2X transmission UE.

At the i-th transmission time, the V2X UE using a sidelink resource structure of FIG. 10 may determine each of transmission power ($P_{PSCCH}$) of the PSCCH and transmission power ($P_{PSSCH}$) of the PSSCH through Equation 15.

$$P_{PSCCH}(i) = \min\{Pc\max(i), P_{0\_PSCCH} + \alpha_{PSCCH} * PL(q) + 10\log 10(M*2^\mu) + \Delta_{PSCCH}(i)\}[\text{dBm}]$$

$$P_{PSSCH}(i) = \min\{Pc\max(i), P_{0\_PSSCH} + \alpha_{PSSCH} * PL(q) + 10\log 10(N1*2^\mu) + \Delta_{PSSCH}(i)\}[\text{dBm}] \quad \text{Equation 15}$$

In Equation 15, each parameter may be interpreted to be the same as Equation 4 illustrated in FIG. 9.

In addition, with respect to the transmission power parameters used in Equation 15, the transmission UE may use the value set by the base station or use the value preset to the UE, by means of the methods mentioned in FIGS. 8 to 12. For example, UEs existing out of the coverage of the base station may not receive transmission power parameters set by the base station. Therefore, these UEs may use values preset with respect to the parameters. The set values may include 0, 0 dB, or 0 dBm. The preset value may indicate a value input in a UE at the factory or, when the UE has existed within the coverage of the base station (the UE is positioned out of the coverage of the base station now), may indicate a value set by the base station.

In another example, even though UEs exist within the coverage of the base station, exchange of parameters between UEs, which are to perform unicast/groupcast communication, may not be performed when a UE pairing for performing unicast communication is not formed (for example, before PC5 RRC configuration is completed), or before a UE grouping for performing groupcast communication is formed. A transmission UE for the unicast and groupcast communications may not set a sidelink transmission power value, based on sidelink path loss estimation. To this end, with respect to the mentioned parameters, the UE may use the preset value or the value transmitted from the base station through RRC configuration and system information of the base station. The values of the parameters used at this time may be different from the values of the parameters used after PC5 RRC configuration. PL(q) that the transmission UE uses before PC5 RRC configuration in Equation 7, Equation 8, Equation 9, Equation 10, and Equation 11 may indicate a path loss value with respect to Uu link between the base station and the transmission UE, not the sidelink path loss value. In addition, when the UE uses the preset parameters, each of the parameters may include the value of 0, 0 dB, or 0 dBm.

In another example, the preset transmission power values or the transmission power values set by the base station, of the PSCCH, the PSSCH, and the PSFCH may be expressed as the transmission power value and the offset value with respect to one channel. For example, when the transmission power values of the PSCCH, the PSSCH, and the PSFCH are preset, the transmission power value of the PSCCH may be set to be [X] dBm, and the offset value for transmission power of the PSSCH and the PSFCH may be set to be +/−[Y] dB (or dBm), based on the transmission power value of the PSCCH. It may equally applied even when the transmission power values of the PSCCH, the PSSCH, and the PSFCH are set by the base station.

Figure 13:
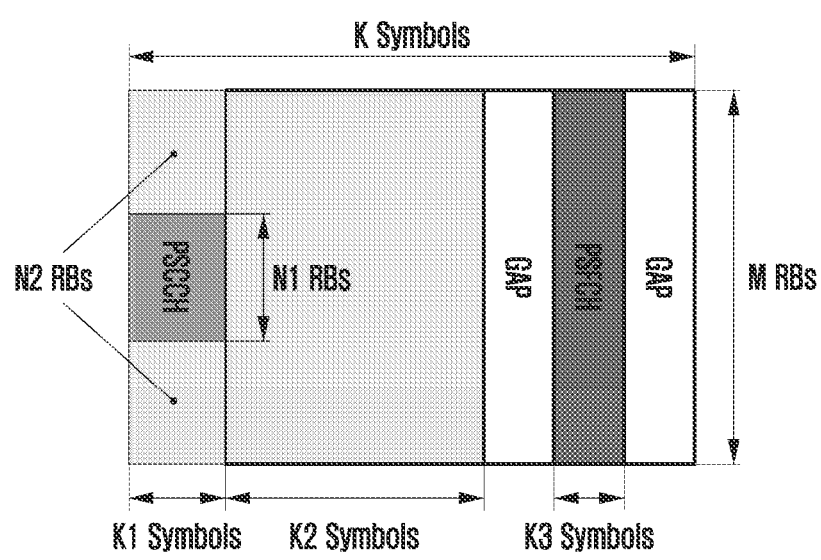
FIG. 13 illustrates a multiplexing method of a sidelink channel within a sidelink resource according to an embodiment of the disclosure.

FIG. 13 illustrates a multiplexing method of a sidelink channel within a sidelink resource according to an embodiment of the disclosure.

Referring to FIG. 13, as shown in FIG. 11, it illustrates that a PSCCH and a PSSCH are frequency-division-multiplexed in K1 symbols, and only the PSSCH is transmitted in K2 symbols, but unlike FIG. 11, illustrates that a PSFCH constituted by K3 symbols exists. The value of K3 may be 1 or an integer larger than 1 (for example, 2 or 3). That is, the K symbols may be constituted by K1 PSCCH/PSSCH symbols frequency-division-multiplexed, K2 PSSCH symbols, K3 PSFCH symbols, and guard symbols (GAP symbols). The values of K1 and K2 may be equal to or different from each other. In addition, when the values of K1 and K2 are different from each other, the values may be to be K1>K2 or K1<K2. The value may be K1+K2+the number of guard symbols 1+K3+the number of guard symbols 2 may be equal to or smaller than K, and the guard symbol 1 and the guard symbol 2 may one or at least two OFDM symbols. The guard symbol 1 and the guard symbol 2 may be OFDM symbols having different lengths. For example, the guard symbol 1 may be constituted by two OFDM symbols, and the guard symbol 2 may be constituted by one OFDM symbol. In addition, in FIG. 13, M is illustrated as the size of resource blocks on the frequency axis of the PSFCH, but the size of resource blocks of the PSFCH may be equal to or different from the size of resource blocks of the PSCCH and the PSSCH. The V2X reception UE may decode the PSSCH, and then transmit the PSFCH including the result (that is, ACK/NACK information) to the V2X transmission UE.

Referring to FIG. 13, the V2X transmission UE may transmit sidelink control information (SCI) through the PSCCH constituted by K1 symbols on the time axis and N2 frequency blocks on the frequency axis. The sidelink control information may include time/frequency allocation information of the PSSCH constituted by K1+K2 symbols on the time axis and M frequency blocks on the frequency axis and be then transmitted. The V2X reception UE may receive, from the transmission UE, and decode the PSCCH, and may then acquire the time/frequency allocation information of the PSSCH and decode the PSSCH. FIG. 13 illustrates the PSSCH constituted by the K2 symbols, which is physically continuously positioned after the PSCCH constituted by the K1 symbols, although they may not be physically continuously positioned (that is, the PSSCH may be logically continuously positioned without being physically continuously positioned after the PSCCH).

Meanwhile, as shown in FIG. 11, in FIG. 13, the PSCCH may be constituted by N1 frequency blocks on the frequency axis. The PSSCH may be constituted by the N2 frequency blocks during the length of the K1 symbols, and may be constituted by M frequency blocks during the length of the K2 symbols (N1+N2=M). At the i-th transmission time, the V2X transmission UE using a sidelink resource structure of FIG. 13 may determine transmission power ($P_{PSCCH}$) of the PSCCH and transmission power ($P_{PSSCH}$) of the PSSCH through Equation 16, Equation 17 or Equation 18.

$$P_{PSCCH}(i) = X1 + \min\{Pc\,\max(i), 10\log 10(X2 \ast 2^\mu) + P_{0\_PSCCH} + \alpha_{PSCCH} \ast PL(q)\}[\text{dBm}] \quad \text{Equation 16}$$

$$P_{PSCCH}(i) = X1 + \min\{Pc\,\max(i), 10\log 10(X2 \ast 2^\mu) + P_{0\_PSCCH} + \alpha_{PSCCH} \ast PL(q), P_{Congestion}\}[\text{dBm}] \quad \text{Equation 17}$$

$$P_{PSCCH}(i) = X1 + \min\{Pc\,\max(i), 10\log 10(X2 \ast 2^\mu) + P_{0\_PSCCH} + \alpha_{PSCCH} \ast PL(q), P_{Congestion}, P_{Range}\}[\text{dBm}] \quad \text{Equation 18}$$

Each parameter of Equation 16, Equation 17, and Equation 18 may indicate the following.

Pcmax(i): Pcmax(i) indicates the maximum UE transmission output at the i-th sidelink transmission and a P-max value (when there is no base station, a preset value) set by a base station through system information or RRC, and may be determined by a UE by means of UE power class included in the UE.

$P_{0\_PSCCH}$: $P_{0\_PSCCH}$ may indicate a value (when there is no base station, a preset value) set by a base station through system information or RRC in order to guarantee link quality of a reception UE.

$\alpha_{PSCCH}$: $\alpha_{PSCCH}$ is a parameter for compensating a path loss value and has a value between 0 and 1, and may indicate a value (when there is no base station, a preset value) set by a base station through system information or RRC. For example, when $\alpha_{PSCCH}=1$, 100% of path loss may be compensated, and when $\alpha_{PSCCH}=0.8$, only 80% of path loss may be compensated.

X1: X1 indicates $$10\log_{10}\left(\frac{10^{\frac{\varepsilon}{10}} \times M_{PSCCH}}{M_{PSSCH} + 10^{\frac{\varepsilon}{10}} \times M_{PSCCH}}\right),$$

and $M_{PSCCH}$ and $M_{PSSCH}$ may indicate the sizes of frequency blocks allocated for transmitting the PSCCH and the PSSCH, respectively. In addition, F is a parameter for power boosting of the PSCCH. For example, when the PSCCH performs power boosting in order to maintain a PSD higher 3 dB than that of the PSSCH, ε may be 3. When the PSCCH and the PSSCH maintain the same PSD (or a case in which power boosting is not performed), ε may be 0. The fixed value may be used as the value of ε (that is, ε is fixed to 3), or the value of ε may be set through RRC and system information of the base station. When there is no base station, the value of ε may be preset. For example, in a case in which the value of ε is set, the V2X transmission UE and reception UE may receive the value of ε which is set through PC-5 RRC, when unicast connection is configured.

X2: X2 indicates $10\log_{10}(M_{PSSCH} + 10^{\varepsilon/10} \times M_{PSCCH})$, and $M_{PSCCH}$, $M_{PSSCH}$, and ε may be the same as the description of X1 above.

2μ: 2μ may be a parameter for compensating a power spectral density (PSD) which varies depending on a subcarrier spacing. For example, a case of using a subcarrier spacing of 15 kHz may indicate that μ=0. Even if the same number of frequency blocks are used, when the subcarrier spacing is doubled to 30 kHz, the PSD may be reduced by half compared with the case of using the subcarrier spacing of 15 kHz. Therefore, in order to compensate the PSD, power is required to be doubled. More specifically, for example, when two frequency blocks are used, 10 log 10(2×20)=3 dB is required for the subcarrier spacing of 15 kHz, whereas, in order to maintain the same PSD as that for the subcarrier spacing of 15 kHz, transmission power is required to be increased to 10 log 10(2×21)=6 dB for the subcarrier spacing of 30 kHz.

PL: PL may indicate an estimated path loss value. The path loss value may be estimated by Equation 2.

$P_{Congestion}$: $P_{Congestion}$ included in Equation 17 and Equation 18 is a parameter reflecting a congestion level of the V2X transmission UE, and may indicate the maximum transmission power that the V2X transmission UE may use according to the congestion level. More specifically, when the base station determines that the congestion level is high in a resource pool configured thereby, the base station may transmit a value of $P_{Congestion}$ to the V2X transmission UE through system information and RRC configuration. In another example, the V2X transmission UE may receive a set value of $P_{Congestion}$ when unicast link connection is configured through PC-5 RRC. In another example, the V2X transmission UE may use a value of $P_{Congestion}$ included in preconfigured resource pool information. The value of $P_{Congestion}$ has a unit of [dBm] and may have a range from −41 [dBm] to 31 [dBm] by 1 [dBm]. The value of $P_{Congestion}$ may be associated with the priority of the PSSCH that the V2X transmission UE transmits. That is, when the priority of the PSSCH that the V2X transmission UE transmits is high, even though the congestion level is high, the set value of $P_{Congestion}$ may be high (for example, 31 [dBm]) because the transmission of the PSCCH and the PSSCH corresponding thereto should be successfully performed. On the other hand, when the priority of the PSSCH that the V2X transmission UE transmits is low and the congestion level is high, since failure in transmission of the PSCCH and the PSSCH corresponding thereto makes no problem (or the transmission may be given up), the set value of $P_{Congestion}$ may be low (for example, −41 [dBm]). Meanwhile, the value of $P_{Congestion}$ may include the value of −∞. Since the value indicates −∞ in a unit of dBm, when the value is converted to a linear domain, the value may 10^(−∞/10)=10^(−∞)=1/(10^∞)≈0 [mW]. In Equation 17, when $P_{Congestion}$=−∞, the value may indicate $P_{PSCCH}(i)$=X1+$P_{Congestion}$=$P_{Congestion}$=−∞ [dBm]. As mentioned above, it may indicate that in the linear domain, the transmission power of the PSCCH is 0 [mW] (that is, the PSCCH is not transmitted).

The resource pool information of the PSCCH may be configured from the base station or PC-5 RRC, or may be preconfigured. Within the configured (or preconfigured) resource pool, a V2X resource allocation mode, in which the V2X transmission UE selects a resource for transmitting the PSCCH through a sensing process, may exist. The sensing process may indicate a process of decoding sidelink control information (SCI) transmitted through the PSCCH and a process of measuring RSRP of the DMRS of the PSSCH associated with the PSCCH. A mode in which the V2X transmission UE selects a resource through the sensing process may be called mode-2. V2X transmission UEs operating in mode-2 may perform decoding of the PSCCH to select the PSCCH resource which may be occupied thereby within the configured (or preconfigured) PSCCH resource pool or the PSCCH resource region. In addition, the V2X transmission UE may measure the congestion level of the PSCCH transmitted from each slot within the PSCCH resource pool or the PSCCH resource region. Similarly, V2X transmission UEs operating in mode-2 may perform decoding of the PSCCH to select the PSSCH resource which may be occupied thereby within the configured (or preconfigured) PSSCH resource pool or the PSSCH resource region, and may measure RSRP of the DMRS transmitted through the PSSCH. In addition, the V2X transmission UE may measure the congestion level of the PSSCH transmitted from each slot within the PSSCH resource pool or the PSSCH resource region.

In mode-2 mentioned above, the congestion level of the PSCCH or the PSSCH may be measured by means of a ratio (B/A) between the entire number of resources constituting the PSCCH resource pool (or PSCCH resource region) or the PSSCH resource pool (or PSSCH resource region) and the number of resources occupied by other UE. That is, when the congestion level of the PSCCH is measured, A may be the entire number of PSCCH resources constituting the PSCCH resource pool, and when the congestion level of the PSSCH is measured, A may be the entire number of PSSCH resources constituting the PSSCH resource pool. When the congestion level of the PSCCH is measured, B may be calculated by comparing the value of a received signal strength indicator (RSSI) of the PSCCH symbols with the critical value of the RSSI, which is set (or is preset) through the base station or PC-5 RRC. For example, assuming that the PSCCH that each UE transmits within the PSCCH resource pool is constituted by x symbols, the total received power (x total received powers) for each of the symbols is obtained to obtain the average of x symbols. Accordingly, the RSSI of the PSCCH that each UE transmits may be measured. The V2X transmission UE may compare the measured value of the RSSI with the critical value of the RSSI, which is set (or preset) through the base station or PC-5 RRC, and may thus determine that the corresponding PSCCH is occupied by other UE when the measured value of the RSSI is larger than the set critical value of the RSSI. Therefore, the corresponding PSCCH may be included in B. Meanwhile, when the congestion level of the PSSCH is measured, B may be calculated by comparing the value of the RSSI of the PSSCH symbols with the critical value of the RSSI, which is set (or preset) through the base station or PC-5 RRC.

The measurement of the congestion level may be calculated during the specific time section. For example, A and B may be measured with respect to the PSCCH resource (or PSSCH resource) existing within the time section to [n-K, n−1] slot of the configured PSCCH resource pool (or PSSCH resource pool). Therefore, the congestion level measured in n slot may indicate the congestion level measured with respect to the PSCCH resource (or PSSCH resource) existing within the time section to [n-K, n−1] slot. The fixed value (or preset value) may be used as K, or K may be set through the base station or PC-5 RRC.

In Equation 17 and Equation 18, when the i-th PSCCH is transmitted, with respect to the congestion level reflected in the value of $P_{Congestion}$ which is set from the base station or PC-5 RRC, the congestion measurement time to obtain the congestion level is required to be defined. For example, the base station or PC-5 RRC may use a measured congestion level result before k1 slot or k2 symbol prior to the i-th PSCCH transmission of the UE transmission UE. That is, the congestion level reflected in the value of $P_{Congestion}$ used for the transmission power calculation of the PSCCH transmitted through the i-th slot may indicate the congestion level measured at i-k1 slot or the congestion level measured before k2 symbol, based on the first symbol of the PSCCH transmitted through the i-th slot. As mentioned above, the congestion level measured at i-k1 slot may indicate the congestion level measured with respect to the PSCCH resource existing within the [i-k1-K, i-k1-1] time section. In addition, the congestion level measured in i-k2 symbol may indicate the congestion level measured with respect to the PSCCH resource existing within the [i-k2-K, i-k2-1] time section.

Equation 16 may be applied in a mode (mode-1) in which the base station schedules a transmission resource of the V2X transmission UE by using downlink control information (DCI) transmitted through a PDCCH. In another example, when the value of $P_{Congestion}$ of Equation 17 is not set from the base station or PC-5 RRC, Equation 16 may be applied, or when both the values of $P_{Range}$ and $P_{Congestion}$ of Equation 18 are not set from the base station or PC-5 RRC, Equation 16 may be applied.

When the value of $P_{Congestion}$ is set from the base station or PC-5 RRC, Equation 17 may be applied. When both the values of $P_{Range}$ and $P_{Congestion}$ are set from the base station or PC-5 RRC, Equation 18 may be applied. The value of $P_{Congestion}$ may be omitted from Equation 18. In that case, when the value of $P_{Range}$ is set from the base station or PC-5 RRC, Equation 18 may be applied.

$P_{Range}$: $P_{Range}$ of Equation 18 may indicate a transmission power value for meeting a range requirement in the V2X communication. More specifically, the range requirement or range information may indicate the minimum distance which guarantees QoS (for example, delay time, reliability, data transmission rate, etc.) of a sidelink data packet transmitted through the unicast or groupcast communication. In the unicast or groupcast V2X communication, the transmission UE may receive information on a range transferred from the upper layer (for example, application layer) thereof. The range information may be expressed as a distance having a unit of meter (m) or may be expressed as an index. That is, an application layer may provide the range information for an AS layer in units of meter (for example, 100 m). In another example, the application layer may provide a range index for the AS layer. In this case, the minimum distance may be mapped to each range index (that is, index 1=100 m, index 2=200 m, etc.). Upon receiving the range information, the AS layer may generate the value of $P_{Range}$ mapped to the corresponding range information. For example, the value of $P_{Range}$ corresponding to the range of 100 m (or range index 1) and the value of $P_{Range}$ corresponding to the range of 200 m (or range index 2) may be generated. In another example, upon receiving the range information transferred from the application layer, the AS layer may transfer the corresponding information to RRC and generate the value of $P_{Range}$ in RRC.

Meanwhile, referring to FIG. 3, the V2X UE may be configured with respect to whether to perform sidelink transmission power by using downlink path loss with the base station or whether to perform sidelink transmission power by using sidelink path loss between V2X UEs. The information may be configured through the configuration of a path loss estimation signal that the V2X transmission UE or the V2X reception UE may use. More specifically, as mentioned in FIG. 3, when sidelink transmission power should be performed by using downlink path loss with the base station, the V2X transmission UE and the V2X reception UE may be configured by the base station such that path loss is estimated by using a downlink synchronization signal block (SSB) or a CSI-RS (that is, a SSB or a CSI-RS is configured as a path loss estimation signal). When sidelink transmission power is performed by using the sidelink path loss between V2X UEs, the V2X transmission UE and the V2X reception UE may be configured by the base station such that path loss is estimated by using a sidelink reference signal (for example, a sidelink CSI-RS transmitted through the PSSCH or a DMRS transmitted through the PSSCH) (that is, a sidelink CSI-RS or a DMRS is configured as a path loss estimation signal).

The sidelink resource pool information may include information on whether to apply the mentioned downlink path loss value to sidelink transmission power, whether to apply an uplink path loss value to sidelink transmission power, or whether to use any path loss estimation signal which may have the same meaning as it. For example, the base station may transmit, to the UE, information on the sidelink resource pool through system information or RRC configuration, and the information on the sidelink resource pool may include set parameters for sidelink transmission power, which may be used in the corresponding resource pool. The parameters for transmission power may include at least one piece of information on $P_{0\_PSCCH}$, $\alpha_{PSCCH}$, and PL(q) mentioned in Equation 16, Equation 17, and Equation 18. More specifically, PL(0) may indicate the application of downlink path loss and may indicate to estimate downlink path loss by using the SSB (q=0). PL(1) may indicate the application of downlink path loss and may indicate to estimate downlink path loss by using the downlink CSI-RS (q=1). In addition, PL(2) may indicate the application of sidelink path loss and may indicate to estimate sidelink path loss by using the sidelink CSI-RS or the sidelink DMRS (q=2). In another example, it may be explicitly written that the SSB, CSI-RS, sidelink CSI-RS, or sidelink DMRS is used for the resource pool information through system information or RRC configuration.

In another example, when there is no base station, the V2X transmission UE may receive set parameters for sidelink transmission power from the preconfigured resource pool information. In that case, the V2X UE may acquire the transmission power parameters mentioned above from the preconfigured resource pool information.

In another example, regardless of whether the base station exists, when unicast connection with the V2X reception UE is configured, the V2X transmission UE may perform PC-5 RRC configuration. As parameters for sidelink transmission power are set from the PC-5 RRC (a case in which the sidelink resource pool information does not include the sidelink transmission power parameters), or as information on the sidelink resource pool is configured from the PC-5 RRC, the parameters for sidelink transmission power may be set (a case in which the sidelink resource pool information includes the sidelink transmission power parameters).

In Equation 16, Equation 17, and Equation 18, when downlink path loss is applied or when sidelink path loss is applied, $P_{0\_PSCCH}$ and $\alpha_{PSCCH}$ may be set to have different values. That is, when the UE applies downlink path loss, $P_{0\_PSCCH}$ and $\alpha_{PSCCH}$ may be set to be A1 and B1, respectively, and when the UE applies sidelink path loss, $P_{0\_PSCCH}$ and $\alpha_{PSCCH}$ may be set to be A2 and B2, respectively. In a scenario where sidelink and Uu link (that is, downlink and uplink) share a frequency, sidelink transmission power control may be performed with the purpose of reducing interference caused by the sidelink transmission in an uplink signal received by the base station, thus a downlink path loss value may be applied. Unlike this, in a scenario where sidelink and Uu link do not share a frequency, as sidelink quality is guaranteed and unnecessarily high transmission power is not used, a sidelink path loss value may be applied in order to reduce power consumption.

Meanwhile, unlike the examples mentioned above, the V2X UE may receive all sidelink transmission power parameters when the downlink path loss value is applied and sidelink transmission power parameters when the sidelink path loss value is applied. That is, the V2X UE may receive, from the base station, through system information or RRC, or through PC-5 RRC of the UE, all of: $P_{0\_PSCCH}$ and $\alpha_{PSCCH}$ which may be used when the downlink path loss value is applied, and the type of path loss estimation signals for estimating downlink path loss (a SSB or a downlink CSI-RS); and $P_{0\_PSCCH}$ and $\alpha_{PSCCH}$ which may be used when the sidelink path loss value is applied, and the type of sidelink path loss estimation signals for estimating sidelink path loss (a sidelink CSI-RS or a sidelink DMRS).

As illustrated above, the resource pool information may include sidelink transmission power parameter information including $P_{0\_PSCCH}$ and $\alpha_{PSCCH}$, and the type of path loss estimation signals for estimating path loss. More specifically, all of: $P_{0\_PSCCH\_DL}$ and $\alpha_{PSCCH\_DL}$ which may be used when the downlink path loss value is applied, and the type of path loss estimation signals used for estimating downlink path loss; and $P_{0\_PSSCH\_SL}$ and $\alpha_{PSSCH\_SL}$ which may be used when the sidelink path loss value is applied, and the type of sidelink path loss estimation signals used for estimating sidelink path loss may be configured in the resource pool information (that is, both a SSB or a downlink CSI-RS and a sidelink CSI-RS or a sidelink DMRS are configured).

In another example, a path loss index set in the resource pool information may indicate the type of path loss estimation signals used for estimating path loss (for example, when q=0 indicates a SSB, q=1 indicates a downlink CSI-RS, and q=2 indicates a sidelink CSI-RS or a sidelink DMRS, both q=0 and q=2 or q=1 and q=2 are set).

When the V2X UE receives all of sidelink transmission power parameters when the downlink path loss value is applied and sidelink transmission power parameters when the sidelink path loss value is applied, the V2X UE may calculate the PSCCH transmission power through Equation 19 or Equation 20.

$$P_{PSCCH}(i)=X1+\min\{Pc\max(i), 10\log 10(X2*2^\mu)+\min\{P1,P2\}\}[\text{dBm}] \quad \text{Equation 19}$$

$$P_{PSCCH}(i)=X1+\min\{Pc\max(i), \min\{P3,P4\}\}[\text{dBm}] \quad \text{Equation 20}$$

Each parameter of Equation 19 and Equation 20 may indicate the following.

Pcmax(i), X1, X2, and $2^\mu$ are the same as what described in Equation 16.

P1: P1 indicates transmission power when the downlink path loss value is applied, and may be $P1=P_{0\_PSCCH\_DL}+\alpha_{PSCCH\_DL}*PL(q)$. The index q expressing path loss may be omitted from P1.

P2: P2 indicates transmission power when the sidelink path loss value is applied, and may be $P2=P_{0\_PSCCH\_SL}+\alpha_{PSCCH\_SL}*PL(q)$. The index q expressing path loss may be omitted from P2.

P3: P3 indicates transmission power when the downlink path loss value is applied, and may be $P3=P1+10\log 10(X2*2^\mu)$. The index q expressing path loss may be omitted from P3.

P4: P4 indicates transmission power when the sidelink path loss value is applied, and may be $P4=P2+10\log 10(X2*2^\mu)$. The index q expressing path loss may be omitted from P4.

Although not shown in Equation 19 and Equation 20, as shown in Equation 17 and Equation 18, $P_{Congestion}$ and $P_{Range}$ may be included in Equation 19 and Equation 20. More specifically, Equation 19 may be expressed as Equation 21.

$$P_{PSCCH}(i)=X1+\min\{Pc\max(i), P_{Congestion}, P_{Range}, 10\log 10(X2*2^\mu)+\min\{P1,P2\}\}[\text{dBm}] \quad \text{Equation 21}$$

Equation 21 illustrates a case in which both $P_{Congestion}$ and $P_{Range}$ are included, but one of $P_{Congestion}$ and $P_{Range}$ may be omitted from Equation 21.

Similarly, Equation 20 may be expressed as Equation 22.

$$P_{PSCCH}(i)=X1+\min\{Pc\max(i), P_{Congestion}, P_{Range}, \min\{P3,P4\}\}[\text{dBm}] \quad \text{Equation 22}$$

Equation 22 illustrates a case in which both $P_{Congestion}$ and $P_{Range}$ are included, but, as shown in Equation 21, one of $P_{Congestion}$ and $P_{Range}$ may be omitted from Equation 22.

Equation 16, Equation 17, Equation 18, Equation 19, Equation 20, Equation 21, and Equation 22 are equations for determining the transmission power value of the PSCCH. Similarly, the transmission power value of the PSSCH may be calculated, but the transmission power of the PSSCH may be calculated while being divided into two parts. The first part is transmission power of the PSSCH, which corresponds to K1 symbols in FIG. 13, and may indicate PSSCH transmission power in symbols during which the PSCCH and the PSSCH are frequency-division-multiplexed. It may be defined as $P_{PSSCH-1}(i)$. The second part is transmission power of the PSSCH, which corresponds to K2 symbols in FIG. 13, and may indicate PSSCH transmission power in symbols during which the PSCCH is not frequency-division-multiplexed. It may be defined as $P_{PSSCH-2}(i)$. $P_{PSSCH-1}(i)$ may be defined by changing X1 defined in each of Equation 16, Equation 17, Equation 18, Equation 19, Equation 20, Equation 21, and Equation 22 to X1-ε. Referring to Equation 21 as an example, when Equation 21 is used for the PSCCH transmission power, $P_{PSSCH-1}(i)$ may be calculated as shown in Equation 23.

$$P_{PSSCH-1}(i)=X1-\varepsilon+\min\{Pc\max(i), P_{Congestion}, P_{Range}, 10\log 10(X2*2^\mu)+\min\{P1,P2\}\}[\text{dBm}] \quad \text{Equation 23}$$

Parameters defined in Equation 23 may be the same as what described in Equation 21. When Equation 16, Equation 17, Equation 18, Equation 19, Equation 20, or Equation 22 is used to calculate the PSCCH transmission power value, X1 defined in each of the equations is changed to X1-ε, and an equation for calculating $P_{PSSCH-1}(i)$ may be thus derived. In addition, in order to calculate $P_{PSSCH-1}(i)$ by means of the modification of Equation 23, Equation 22 may be used to apply $P_{PSSCH-1}(i)=X1-\varepsilon+\min\{Pcmax(i), P_{Congestion}, P_{Range}, \min\{P3, P4\}\}$ [dBm].

The transmission power equation with respect to the first part of the PSCCH and the PSSCH constituting K1 symbols in FIG. 13 has been described. Based on it, the equation for calculating the transmission power value ($P_{PSSCH-2}(i)$) with respect to the second part of the PSSCH may be defined by considering the following.

As illustrated in FIG. 13, when the number of symbols that a single V2X transmission UE uses for transmitting the i-th PSCCH and the PSSCH is K1+K2, each symbol constituting the K1+K2 symbols should have the same transmission power. When the transmission power of each of the symbols is not the same, since a guard section (or GAP) for power transient is required between symbols whose transmission power is changed, inefficient use of resources may occur. In addition, when the transmission power level between symbols is changed, the reception performance of the corresponding symbols at the reception side may be degraded due to the change in phase between the symbols. Therefore, the transmission power of the K1 symbols during which the PSCCH and the PSSCH are frequency-division-multiplexed and the transmission power of the K2 symbols during which only the PSSCH is transmitted should be equally maintained. To this end, the transmission power value ($P_{PSSCH-2}(i)$) with respect to the second part of the PSSCH may be determined through Equation 24.

$$P_{PSSCH-2}(i) = P_{PSCCH}(i) + P_{PSSCH-1}(i) \text{ [dBm]} \qquad \text{Equation 24}$$

The parameters of Equation 24 are the same as what mentioned in Equation 16, Equation 17, Equation 18, Equation 19, Equation 20, Equation 21, Equation 22, and Equation 23. In Equation 24, each of $P_{PSCCH}(i)$ and $P_{PSSCH-1}(i)$ may be smaller than the value of Pcmax(i) which is the UE maximum transmission power (that is, $P_{PSCCH}(i)$<Pcmax(i) and $P_{PSSCH-1}(i)$<Pcmax(i)), but $P_{PSSCH-2}(i)$ which is the sum of $P_{PSCCH}(i)$ and $P_{PSSCH-1}(i)$ may be larger than Pcmax(i). In that case, $P_{PSSCH-2}(i)$ may be recalculated through Equation 25 and Equation 26.

$$P'_{PSSCH-2}(i) = \min\{Pc\ max(i), P_{PSSCH-2}(i)\} \text{[dBm]} \qquad \text{Equation 25}$$

$$P'_{PSSCH-2}(i) = \delta \cdot P_{PSSCH-2}(i) \text{ [dBm]} \qquad \text{Equation 26}$$

In Equation 26, δ is a scaling factor and may be larger than 0, and smaller than or equal to 1. In order to satisfy $P_{PSSCH-2}(i) \leq$ Pcmax(i), the value of δ may be set by the transmission UE.

In a case of $P'_{PSSCH-2}(i)$=Pcmax(i) by Equation 25, as mentioned above, it occurs that $P_{PSCCH}(i) + P_{PSSCH-1}(i) = P_{PSSCH-2}(i)$>Pcmax(i). That is, since $P_{PSSCH-2}(i)$ is limited by Pcmax(i) and the transmission power is thus changed, the transmission power of $P_{PSCCH}(i) + P_{PSSCH-1}(i)$ should be changed in order to enable the K1 symbols and the K2 symbols to use the same transmission power. To this end, $\beta \cdot [P_{PSCCH}(i) + P_{PSSCH-1}(i)]$ is used to scale down the sum of the transmission power such that $P_{PSCCH}(i) + P_{PSSCH-1}(i) \leq$ Pcmax(i) is satisfied. β is a scaling factor and may be larger than 0, and smaller than or equal to 1. In another example, as described in Equation 12 and Equation 13, the transmission power of $P_{PSSCH-2}(i)$ is redistributed at a rate between the transmission powers of $P_{PSCCH}(i)$ and $P_{PSSCH-1}(i)$ and may update each of the transmission power values of $P_{PSCCH}(i)$ and $P_{PSSCH-1}(i)$. That is, when the updated transmission power values of $P_{PSCCH}(i)$ and $P_{PSSCH-1}(i)$ are defined as $P'_{PSCCH}(i)$ and $P'_{PSSCH-1}(i)$, respectively, they may be calculated through $P'_{PSCCH}(i) = 10 \log 10[X1*Y/(X1+X2)]$ and $P'_{PSSCH-1}(i) = 10 \log 10[X2*Y/(X1+X2)]$ (Equation 13). X1 and X2 are the same as what defined in Equation 12 and Y may indicate $Y = 10^{\wedge}[P_{PSSCH-2}(i)/10]$.

Similarly, when the transmission power of $P_{PSSCH-2}(i)$ is changed to that of $P'_{PSSCH-2}(i)$ by Equation 26, the transmission power of $P_{PSCCH}(i) + P_{PSSCH-1}(i)$ should be changed in order to enable the K1 symbols and the K2 symbols to use the same transmission power. To this end, as illustrated above, $\beta \cdot [P_{PSCCH}(i) + P_{PSSCH-1}(i)]$ is used to scale down the sum of the transmission power of $P_{PSCCH}(i) + P_{PSSCH-1}(i)$, or the changed transmission power value of $P_{PSSCH-2}(i)$ is redistributed at a ratio between the transmission powers of $P_{PSCCH}(i)$ and $P_{PSSCH-1}(i)$, and each of the transmission power values of $P_{PSCCH}(i)$ and $P_{PSSCH-1}(i)$ may thus be updated.

The transmission power parameters used in Equation 16, Equation 17, Equation 18, Equation 19, Equation 20, Equation 21, Equation 22, Equation 23, Equation 24, and Equation 26 may use the value set to the transmission UE by the base station or may use the value preset in the UE by means of the methods mentioned in FIGS. 8 to 12. For example, UEs existing out of the coverage of the base station may not receive set transmission power parameters from the base station. Therefore, these UEs may use preset values with respect to the parameters. The set values may include 0, 0 dB, or 0 dBm. The preset value may indicate a value input in the UE in the factory, or when the UE has existed within the coverage of the base station (the UE is positioned out of the coverage of the base station now), may indicate a value set by the base station.

In another example, even though UEs exist within the coverage of the base station, exchange of parameters between UEs, which are to perform unicast/groupcast communication, may not be performed when a UE pairing for performing unicast communication is not formed (for example, before PC5 RRC configuration is completed), or before a UE grouping for performing groupcast communication is formed. A transmission UE for the unicast and groupcast communications may not set a sidelink transmission power value, based on sidelink path loss estimation. To this end, with respect to the mentioned parameters, the UE may use the preset value or the value transmitted from the base station through RRC configuration and system information of the base station. The values of the parameters used at this time may be different from the values of the parameters used after PC5 RRC configuration. PL(q) that the transmission UE uses before PC5 RRC configuration may indicate a path loss value with respect to Uu link between the base station and the transmission UE, not the sidelink path loss value. In addition, when the UE uses the preset parameters, each of the parameters may include the value of 0, 0 dB, or 0 dBm.

In another example, the preset transmission power values or the transmission power values set by the base station, of the PSCCH, the PSSCH, and the PSFCH may be expressed as the transmission power value and the offset value with respect to one channel. For example, when the transmission power values of the PSCCH, the PSSCH, and the PSFCH are preset, the transmission power value of the PSCCH may be set to be [X] dBm, and the offset value for transmission power of the PSSCH and the PSFCH may be set to be +/−[Y] dB (or dBm), based on the transmission power value of the PSCCH. It may equally applied even when the transmission power values of the PSCCH, the PSSCH, and the PSFCH are set by the base station.

Figure 14:
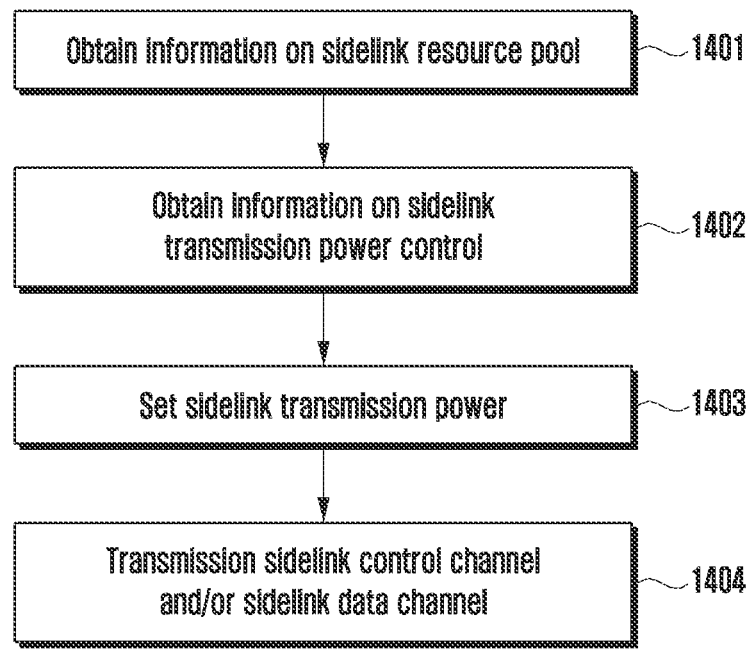
FIG. 14 illustrates an operational flowchart of a V2X UE for sidelink transmission power control according to an embodiment of the disclosure.

FIG. 14 illustrates an operational flowchart of a V2X UE for sidelink transmission power control according to an embodiment of the disclosure.

Referring to FIG. 14, the V2X transmission UE may determine whether the V2X transmission UE exists within the coverage of the base station (FIG. 1A) or whether the V2X transmission UE exists out of the coverage of the base station (FIG. 1C). Upon determining whether the V2X transmission UE exists within the coverage of the base station, the UE may obtain information on a sidelink resource pool at operation 1401. For example, upon recognizing that the UE exists within the coverage of the base station, the UE may obtain information on a sidelink resource pool through RRC configuration or system information transmitted by the base station. Unlike this, upon recognizing that the UE exists out of the coverage of the base station, the UE may obtain information on a sidelink resource pool through system information preconfigured in the UE.

Upon obtaining information on a resource pool from the base station or obtaining information on a preconfigured resource pool, the UE may obtain information on sidelink transmission power parameters included in sidelink resource pool information at operation 1402. The sidelink transmission power parameters included in the sidelink resource pool information may include at least one of the following parameters.

$P_0$: A parameter for guaranteeing link quality of a reception UE $\alpha$: $\alpha$ is a parameter for guaranteeing a path loss value and has a value between 0 and 1.

Number of RBs: A parameter on the size of frequency blocks that the UE may use for transmitting sidelink control information and data information Subcarrier spacing: A parameter on a subcarrier spacing used for transmitting sidelink control information and data information A reference signal used for path loss estimation. That is, a reference signal may indicate a synchronization signal transmitted through downlink of the base station or a DMRS of a physical broadcast channel (PBCH), which is transmitted through downlink of the base station, or may indicate a parameter indicating which signal the UE uses to estimate path loss, among sidelink reference signals transmitted through sidelink between UEs.

A parameter on multiplexing methods of a sidelink control channel and a sidelink data channel (for example, information on whether a channel is time-divided and transmitted as shown in FIGS. 8, 9, and 12 or whether a channel is frequency-divided and transmitted as shown in FIGS. 10 and 11.

The V2X transmission UE uses information on the parameters to set transmission powers of the sidelink control channel and the sidelink data channel at operation 1403. The V2X transmission UE uses the set transmission power value to transmit the sidelink control channel and the sidelink data channel at operation 1404.

Figure 15:
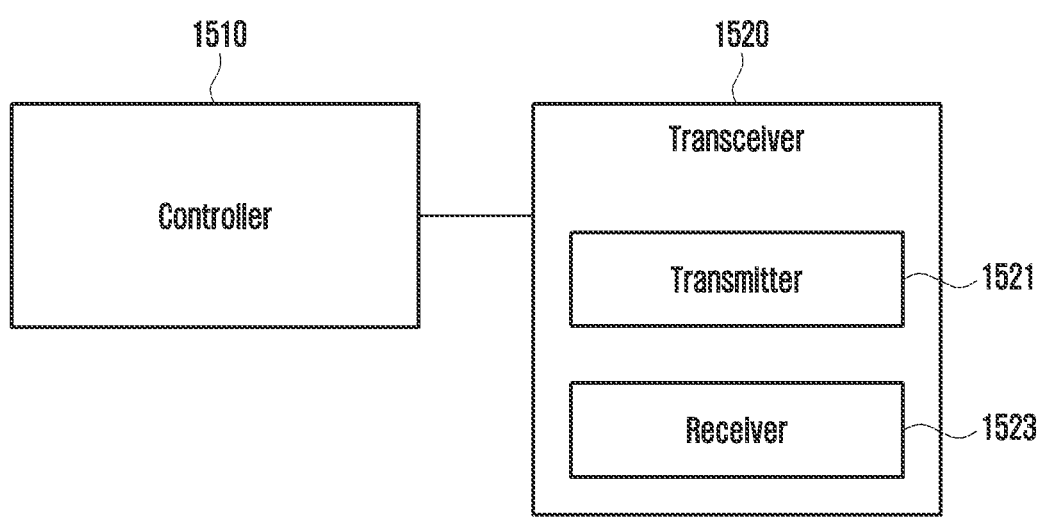
FIG. 15 is a diagram illustrating a UE configuration according to an embodiment of the disclosure.

FIG. 15 is a diagram illustrating a UE configuration according to an embodiment of the disclosure.

Referring to FIG. 15, the UE according to an embodiment may include a transceiver 1520 and a controller 1510 configured to control the entire operation of the UE. The transceiver 1520 may include a transmitter 1521 and a receiver 1523.

The transceiver 1520 may transmit/receive a signal to/from other network entities.

The controller 1510 may control the UE to perform one action of the embodiments mentioned above. Meanwhile, the controller 1510 and the transceiver 1520 are not necessarily implemented as separate modules, and may be implemented as a single element in the form of a single chip. In addition, the controller 1510 and the transceiver 1520 may be electrically connected to each other. For example, the controller 1510 may be a circuit, an application-specific circuit, or at least one processor. In addition, operations of the UE may be realized by providing a memory device storing corresponding program codes to any element in the UE.

Figure 16:
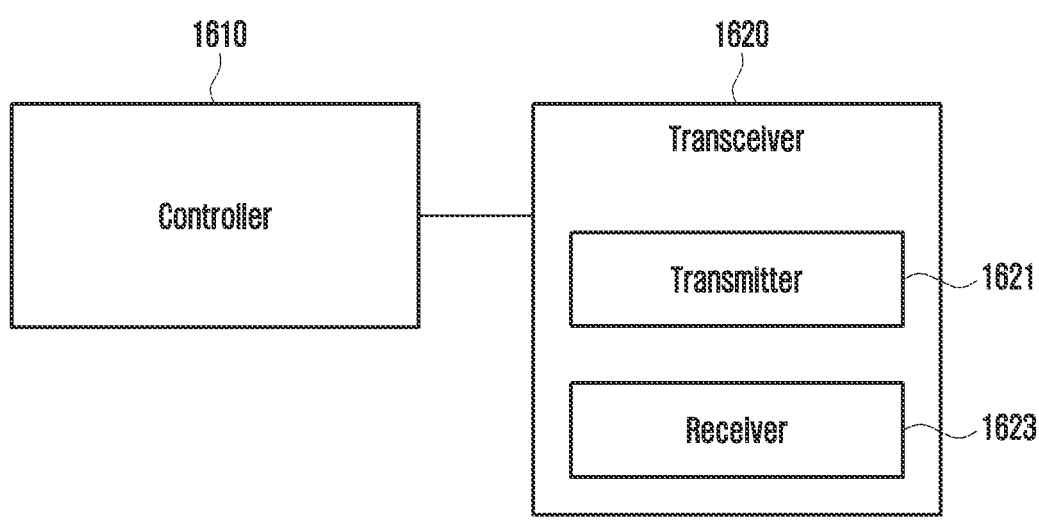
FIG. 16 is a diagram illustrating a base station's configuration according to an embodiment of the disclosure.

FIG. 16 is a diagram illustrating a base station's configuration according to an embodiment of the disclosure.

Referring to FIG. 16, the base station according to an embodiment may include a transceiver 1620 and a controller 1610 configured to control the entire operation of the base station. The transceiver 1620 may include a transmitter 1621 and a receiver 1623.

The transceiver 1620 may transmit/receive a signal to/from other network entities.

The controller 1610 may control the base station to perform one action of the embodiments mentioned above. Meanwhile, the controller 1610 and the transceiver 1620 are not necessarily implemented as separate modules, and may be implemented as a single element in the form of a single chip. In addition, the controller 1610 and the transceiver 1620 may be electrically connected to each other. For example, the controller 1610 may be a circuit, an application-specific circuit, or at least one processor. In addition, operations of the base station may be realized by providing a memory device storing corresponding program codes to any element in the base station.

It should be noted that a configuration diagram, an exemplar diagram of a control/data signal transmission method, an operational procedure exemplar diagram, and configuration diagrams, which are illustrated in FIGS. 1A to 1D, 2A and 2B, 3 to 16, are not intended to limit the scope of the disclosure. That is, all of the elements, entities, or operations described in FIGS. 1A to 1D, 2A and 2B, 3 to 16 should not be interpreted as essential elements for the implementation of the disclosure, and only some of the elements can be used to implement the disclosure within the scope which does not impair the nature of the disclosure.

The above described operations of the base station or UE may be implemented by providing a memory device storing corresponding program codes to any element in the base station or UE. That is, the controller of the base station or UE may perform the above described operations by reading and executing the program code stored in the memory device by means of a processor or a central processing unit (CPU). Methods according to embodiments of the disclosure as defined by the appended claims or disclosed herein may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access an electronic device which performs embodiments of the disclosure, via an external port. Further, a separate storage device on the communication network may access an electronic device which performs embodiments of the disclosure.

In the above-described detailed embodiments of the disclosure, an element included in the disclosure is expressed in the singular or the plural according to a presented detailed embodiment. However, the singular or plural expressions are selected to be suitable for proposed situations for convenience of description, and the disclosure is not limited to the singular or plural elements. An element expressed in a plural form may be configured in singular, or an element expressed in a singular form may be configured in plural.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
    receiving, from a base station, a radio resource control (RRC) message including information related to a sidelink transmission power;
    determining a first power for sidelink data channel transmission in a symbol where a sidelink control channel and a sidelink data channel are not simultaneously transmitted, based on the information;
    determining a second power for the sidelink control channel transmission and a third power for the sidelink data channel transmission in a symbol where the sidelink control channel and the sidelink data channel are simultaneously transmitted, based on the determined first power;
    transmitting the sidelink data channel based on the first power in the symbol where the sidelink control channel and the sidelink data channel are not simultaneously transmitted; and
    transmitting the sidelink control channel and the sidelink data channel based on the second power and the third power in the symbol where the sidelink control channel and the sidelink data channel are simultaneously transmitted.

2. The method of claim 1, wherein the sidelink control channel and the sidelink data channel are frequency division multiplexed in the symbol where the sidelink control channel and the sidelink data channel are simultaneously transmitted.

3. The method of claim 1, wherein the second power is determined based on a number of resource blocks for the sidelink control channel transmission in the symbol.

4. The method of claim 3, wherein the second power is determined based on a ratio of the number of resource blocks for the sidelink control channel transmission and the sidelink data channel transmission where the sidelink control channel and the sidelink data channel are not simultaneously transmitted.

5. The method of claim 1, wherein the third power is determined based on a number of resource blocks for a sidelink data channel transmission in the symbol where the sidelink control channel and the sidelink data channel are simultaneously transmitted.

6. A method performed by a base station in a wireless communication system, the method comprising:
    transmitting, to a user equipment (UE), a radio resource control (RRC) message including information related to a sidelink transmission power;
    receiving a sidelink data channel based on a first power in a symbol where a sidelink control channel and the sidelink data channel are not simultaneously transmitted; and
    receiving the sidelink control channel and the sidelink data channel based on a second power and a third power in the symbol where the sidelink control channel and the sidelink data channel are simultaneously transmitted,
    wherein the first power for the sidelink data channel transmission in a symbol where the sidelink control channel and the sidelink data channel are not simultaneously transmitted, is determined based on the information, and
    wherein the second power for the sidelink control channel transmission and the third power for the sidelink data channel transmission in a symbol where the sidelink control channel and the sidelink data channel are simultaneously transmitted, are determined based on the determined first power.

7. The method of claim 6, wherein the sidelink control channel and the sidelink data channel are frequency division multiplexed in the symbol where the sidelink control channel and the sidelink data channel are simultaneously transmitted.

8. The method of claim 6, wherein the second power is determined based on a number of resource blocks for the sidelink control channel transmission in the symbol.

9. The method of claim 8, wherein the second power is determined based on a ratio of the number of resource blocks for the sidelink control channel transmission and the sidelink data channel transmission where the sidelink control channel and the sidelink data channel are not simultaneously transmitted.

10. The method of claim 6, wherein the third power is determined based on a number of resource blocks for a sidelink data channel transmission in the symbol where the sidelink control channel and the sidelink data channel are simultaneously transmitted.

11. A first user equipment (UE) comprising:
    a transceiver configured to transmit or receive at least one signal; and
    at least one processor coupled to the transceiver,
    wherein the at least one processor is configured to:
        receive, from a base station, a radio resource control (RRC) message including information related to a sidelink transmission power,
        determine a first power for sidelink data channel transmission in a symbol where a sidelink control channel and a sidelink data channel are not simultaneously transmitted, based on the information,
        determine a second power for the sidelink control channel transmission and a third power for the sidelink data channel transmission in a symbol where the sidelink control channel and the sidelink data channel are simultaneously transmitted, based on the determined first power,
        transmit the sidelink data channel based on the first power in the symbol where the sidelink control channel and the sidelink data channel are not simultaneously transmitted, and
        transmit the sidelink control channel and the sidelink data channel based on the second power and the third power in the symbol where the sidelink control channel and the sidelink data channel are simultaneously transmitted.

12. The UE of claim 11, wherein the sidelink control channel and the sidelink data channel are frequency division multiplexed in the symbol where the sidelink control channel and the sidelink data channel are simultaneously transmitted.

13. The UE of claim 11, wherein the second power is determined based on a number of resource blocks for the sidelink control channel transmission in the symbol.

14. The UE of claim 13, wherein the second power is determined based on a ratio of the number of resource blocks for the sidelink control channel transmission and the sidelink data channel transmission where the sidelink control channel and the sidelink data channel are not simultaneously transmitted.

15. The UE of claim 11, wherein the third power is determined based on a number of resource blocks for a sidelink data channel transmission in the symbol where the sidelink control channel and the sidelink data channel are simultaneously transmitted.

16. A base station comprising:
a transceiver configured to transmit or receive at least one signal; and
at least one processor coupled to the transceiver,
wherein the at least one processor is configured to:
transmit, to a user equipment (UE), a radio resource control (RRC) message including information related to a sidelink transmission power,
receive a sidelink data channel based on a first power in a symbol where a sidelink control channel and the sidelink data channel are not simultaneously transmitted, and
receive the sidelink control channel and the sidelink data channel based on a second power and a third power in the symbol where the sidelink control channel and the sidelink data channel are simultaneously transmitted,
wherein the first power for the sidelink data channel transmission in a symbol where the sidelink control channel and the sidelink data channel are not simultaneously transmitted, is determined based on the information, and
wherein the second power for the sidelink control channel transmission and the third power for the sidelink data channel transmission in a symbol where the sidelink control channel and the sidelink data channel are simultaneously transmitted, are determined based on the determined first power.

17. The base station of claim 16, wherein the sidelink control channel and the sidelink data channel are frequency division multiplexed in the symbol where the sidelink control channel and the sidelink data channel are simultaneously transmitted.

18. The base station of claim 16, wherein the second power is determined based on a number of resource blocks for the sidelink control channel transmission in the symbol.

19. The base station of claim 18, wherein the second power is determined based on a ratio of the number of resource blocks for the sidelink control channel transmission and the sidelink data channel transmission where the sidelink control channel and the sidelink data channel are not simultaneously transmitted.

20. The base station of claim 16, wherein the third power is determined based on a number of resource blocks for a sidelink data channel transmission in the symbol where the sidelink control channel and the sidelink data channel are simultaneously transmitted.

* * * * *